US008156757B2

(12) United States Patent
Doty et al.

(10) Patent No.: US 8,156,757 B2
(45) Date of Patent: Apr. 17, 2012

(54) HIGH CAPACITY CHILLER COMPRESSOR

(75) Inventors: Mark C. Doty, Stuarts Draft, VA (US);
Earl A. Campaigne, Jr., Waynesboro, VA (US); Thomas E. Watson, Staunton, VA (US); Paul K. Butler, Keswick, VA (US); Quentin E. Cline, Swoope, VA (US); Samuel J. Showalter, Verona, VA (US)

(73) Assignee: AFF-McQuay Inc., Minneapolis, MN (US)

( * ) Notice: Subject to any disclaimer, the term of this patent is extended or adjusted under 35 U.S.C. 154(b) by 815 days.

(21) Appl. No.: 11/868,341

(22) Filed: Oct. 5, 2007

(65) Prior Publication Data

US 2008/0115527 A1 May 22, 2008

Related U.S. Application Data

(60) Provisional application No. 60/849,865, filed on Oct. 6, 2006.

(51) Int. Cl.
*F25B 31/00* (2006.01)

(52) U.S. Cl. ............... 62/505; 62/402; 62/209; 417/42; 417/372

(58) Field of Classification Search ............... 62/193, 62/209, 402, 510, 505, 515, 180, 181, 408, 62/498; 318/811, 254, 801; 415/170.1, 206, 415/208.3, 162; 416/182; 417/2, 244, 350, 417/423.1, 15–17, 19, 50, 42, 372; 369/69; 323/255
See application file for complete search history.

(56) References Cited

U.S. PATENT DOCUMENTS

| 2,063,362 | A | * | 12/1936 | Barkeij | 123/79 R |
| 2,453,524 | A | * | 11/1948 | McMahan et al. | 415/208.4 |
| 2,581,709 | A | | 1/1952 | Rogers | |
| 2,809,590 | A | * | 10/1957 | Brown | 417/357 |

(Continued)

FOREIGN PATENT DOCUMENTS

CN 2184287 Y 11/1994

(Continued)

OTHER PUBLICATIONS

"2003 Standard for Performance Rating of Water-Chilling Packages Using the Vapor Compression Cycle," Air-Conditioning & Refrigeration Institute, 2003, pp. 1-30.

(Continued)

*Primary Examiner* — Frantz Jules
*Assistant Examiner* — Emmanuel Duke
(74) *Attorney, Agent, or Firm* — Patterson Thuente Christensen Pedersen, P.A.

(57) ABSTRACT

A high efficiency, low maintenance single stage or multi-stage centrifugal compressor assembly for large cooling installations. The assembly is highly efficient by virtue of a variable frequency drive (VFD) that drives a permanent magnet motor and matches compressor speed with compressor load, a direct drive impeller that eliminates gearing losses, and magnetic bearings that reduce frictional losses. The back-emf produced by the motor provides an intermediate power source for the magnetic bearings in the event of a loss of electrical power. A cooling system provides direct cooling of the rotor with gas refrigerant, and cooling of the stator with liquid refrigerant. Modular construction allows the compressor to be retrofit with upgrades. An inlet guide vane system operates without need for oil lubrication. The use of light metal castings and elimination of gearing reduces the weight to one-third or less of comparably powered conventional units.

2 Claims, 23 Drawing Sheets

U.S. PATENT DOCUMENTS

| | | | |
|---|---|---|---|
| 3,063,259 A | | 11/1962 | Hankison et al. |
| 3,158,009 A | * | 11/1964 | Rayner ............................ 62/505 |
| 3,267,868 A | * | 8/1966 | Page ............................ 417/370 |
| 3,306,074 A | * | 2/1967 | Wilson ............................ 62/505 |
| 3,479,541 A | * | 11/1969 | Robinson ........................ 310/54 |
| 3,499,388 A | * | 3/1970 | Eberhardt ..................... 415/132 |
| 3,541,875 A | * | 11/1970 | Demorest ........................ 74/468 |
| 3,717,912 A | * | 2/1973 | Lahm ................................ 29/39 |
| 3,945,219 A | | 3/1976 | Kasahara |
| 4,182,137 A | | 1/1980 | Erth |
| 4,255,784 A | * | 3/1981 | Rosa ............................ 363/129 |
| 4,275,558 A | * | 6/1981 | Hatch et al. ..................... 60/791 |
| 4,363,596 A | * | 12/1982 | Watson et al. .................... 415/1 |
| 4,441,064 A | * | 4/1984 | Cutler et al. ................. 318/798 |
| 4,503,684 A | * | 3/1985 | Mount et al. ..................... 62/115 |
| 4,609,862 A | * | 9/1986 | Becker et al. ................... 322/90 |
| 4,616,483 A | * | 10/1986 | Leonard ........................... 62/115 |
| 4,725,206 A | | 2/1988 | Glaser et al. |
| 4,748,831 A | | 6/1988 | Shaw |
| 4,786,238 A | | 11/1988 | Glaser et al. |
| 4,797,448 A | * | 1/1989 | Liang ............................ 525/106 |
| 4,808,069 A | * | 2/1989 | Bonner et al. ................. 415/160 |
| 4,932,206 A | * | 6/1990 | Sawyer et al. .............. 60/39.23 |
| 5,113,669 A | | 5/1992 | Coffinberry |
| 5,220,809 A | | 6/1993 | Voss |
| 5,363,674 A | | 11/1994 | Powell |
| 5,467,613 A | * | 11/1995 | Brasz .............................. 62/402 |
| 5,499,509 A | | 3/1996 | Harold et al. |
| 5,506,487 A | * | 4/1996 | Young et al. ................. 318/811 |
| 5,555,956 A | | 9/1996 | Voss et al. |
| 5,669,756 A | * | 9/1997 | Brasz et al. .................. 415/58.2 |
| 5,747,907 A | * | 5/1998 | Miller ............................ 310/90 |
| 5,857,348 A | | 1/1999 | Conroy |
| 5,924,847 A | | 7/1999 | Scaringe et al. |
| 6,009,722 A | * | 1/2000 | Choi et al. ..................... 62/505 |
| 6,010,302 A | | 1/2000 | Oeynhausen |
| 6,039,534 A | | 3/2000 | Stoner et al. |
| 6,087,744 A | * | 7/2000 | Glauning ........................ 310/58 |
| 6,116,040 A | | 9/2000 | Stark |
| 6,176,092 B1 | | 1/2001 | Butterworth et al. |
| 6,194,852 B1 | | 2/2001 | Lovatt et al. |
| 6,220,341 B1 | | 4/2001 | Izumi et al. |
| 6,279,340 B1 | | 8/2001 | Butterworth et al. |
| 6,296,441 B1 | | 10/2001 | Gozdawa |
| 6,304,011 B1 | | 10/2001 | Pullen et al. |
| 6,375,438 B1 | | 4/2002 | Seo |
| 6,390,789 B1 | | 5/2002 | Grob et al. |
| 6,408,645 B1 | | 6/2002 | Tsuboe et al. |
| 6,464,469 B1 | | 10/2002 | Grob et al. |
| 6,484,490 B1 | * | 11/2002 | Olsen et al. ................. 60/39.281 |
| 6,519,959 B2 | | 2/2003 | Kim et al. |
| 6,564,560 B2 | | 5/2003 | Butterworth et al. |
| 6,579,078 B2 | | 6/2003 | Hill et al. |
| 6,599,104 B2 | | 7/2003 | Saito et al. |
| 6,616,421 B2 | | 9/2003 | Mruk et al. |
| 6,674,187 B2 | | 1/2004 | Isozaki et al. |
| 6,688,124 B1 | | 2/2004 | Stark et al. |
| 6,746,215 B2 | | 6/2004 | Tani et al. |
| 6,958,126 B2 | | 10/2005 | Goble |
| 7,027,279 B2 | * | 4/2006 | Levin et al. ..................... 361/58 |
| 7,135,828 B2 | | 11/2006 | Lin |
| 7,156,627 B2 | | 1/2007 | Lenderink et al. |
| 7,181,928 B2 | | 2/2007 | De Larminat |
| 7,240,515 B2 | | 7/2007 | Conry |
| 7,252,474 B2 | | 8/2007 | Belokon et al. |
| 7,451,616 B2 | | 11/2008 | Ro |
| 2001/0037651 A1 | * | 11/2001 | Butterworth et al. ........... 62/193 |
| 2002/0079158 A1 | | 6/2002 | Liu |
| 2004/0107688 A1 | | 6/2004 | Wuest et al. |
| 2005/0135126 A1 | * | 6/2005 | Gazel et al. ..................... 363/67 |
| 2005/0223737 A1 | | 10/2005 | Conroy |
| 2005/0284173 A1 | | 12/2005 | de Larminat |
| 2006/0013707 A1 | * | 1/2006 | Oklejas et al. ................ 417/407 |
| 2006/0093477 A1 | * | 5/2006 | Jones ............................ 415/206 |
| 2007/0059179 A1 | | 3/2007 | Xu |
| 2007/0075596 A1 | | 4/2007 | Hall |
| 2007/0212232 A1 | | 9/2007 | De Larminat |
| 2009/0229280 A1 | | 9/2009 | Doty et al. |

FOREIGN PATENT DOCUMENTS

| | | |
|---|---|---|
| EP | 1 063 430 | 12/1989 |
| EP | 0 956 634 | 10/2005 |
| JP | 2000120595 | 4/2000 |
| KR | 10-1988-7000169 A | 2/1998 |
| KR | 10-2006-0081791 A | 7/2006 |
| KR | 10-2006-0118432 A | 11/2006 |
| KR | 10-0748892 B1 | 10/2007 |
| WO | WO 94/29597 | 12/1994 |
| WO | WO 02/44632 | 6/2002 |
| WO | WO 02/50481 | 6/2002 |
| WO | WO 03/072946 | 9/2003 |

OTHER PUBLICATIONS

"Heating, Ventilating, and Air-Conditioning Systems and Equipment," 1996 ASHRAE Handbook, 1996, pp. 34.25-34.27 American Society of Heating, Refrigerating and Air-Conditioning Engineers, Inc. Atlanta, Georgia.

"Fundamentals," 2005 ASHRAE Handbook, 2005, pp. 1.10-1.11, American Society of Heating, Refrigerating and Air-Conditioning Engineers, Inc., Atlanta, Georgia.

Kanki et al., "Development of a High Efficiency Centrifugal Heat Pump with Active Magnetic Bearings," Mitsubishi Heavy Industries, Ltd., Feb. 1992, pp. 1-6, Tokyo, Japan.

"Electric Drive for Flexibility on a German Pipeline Booster Station," S2M Bulletin, available at: http://ww.s2m.fr/E//4-APPLICATIONS/jofim.html.

"Onboard a High Speed Train,": S2M Bulletin, available at: http://www.s2m.fr/E/4-APPLICATIONS/air-cond.html.

U.S. Appl. No. 12/404,010, filed Jan. 13, 2009, Doty et al.

Carrier, "Evergreen Centrifugal Chillers with Unit-Mounted Variable Frequency Drive" 1999 Carrier Corporation, Syracuse, New York.

Written Opinion of the International Searching Authority (Form PCT/ISA/237) for International Application No: PCT/US07/21536 dated Apr. 4, 2008.

Chinese Office Action for Chinese Application No. 200780044367.1 dated Feb. 5, 2010.

Chinese Office Action of CN200780044367.1, dated Oct. 25, 2010.

Chinese Office Action of Chinese Application No. 200780044367.1 dated Feb. 5, 2010.

International Search Report and Written Opinion for International Application No. PCT/US2009/037181, dated Oct. 27, 2009.

Examiner's Report No. 2 on Patent Application No. 2007307051, dated Mar. 23, 2011.

Examiner's Report No. 1 on Patent Application No. 2009223279, dated Aug. 17, 2011.

Examiner's Report No. 3 on Patent Application No. 2007307051, dated Oct. 5, 2011.

The Third Office Action on Patent Application No. 200780044367.1, dated Jul. 12, 2011.

* cited by examiner

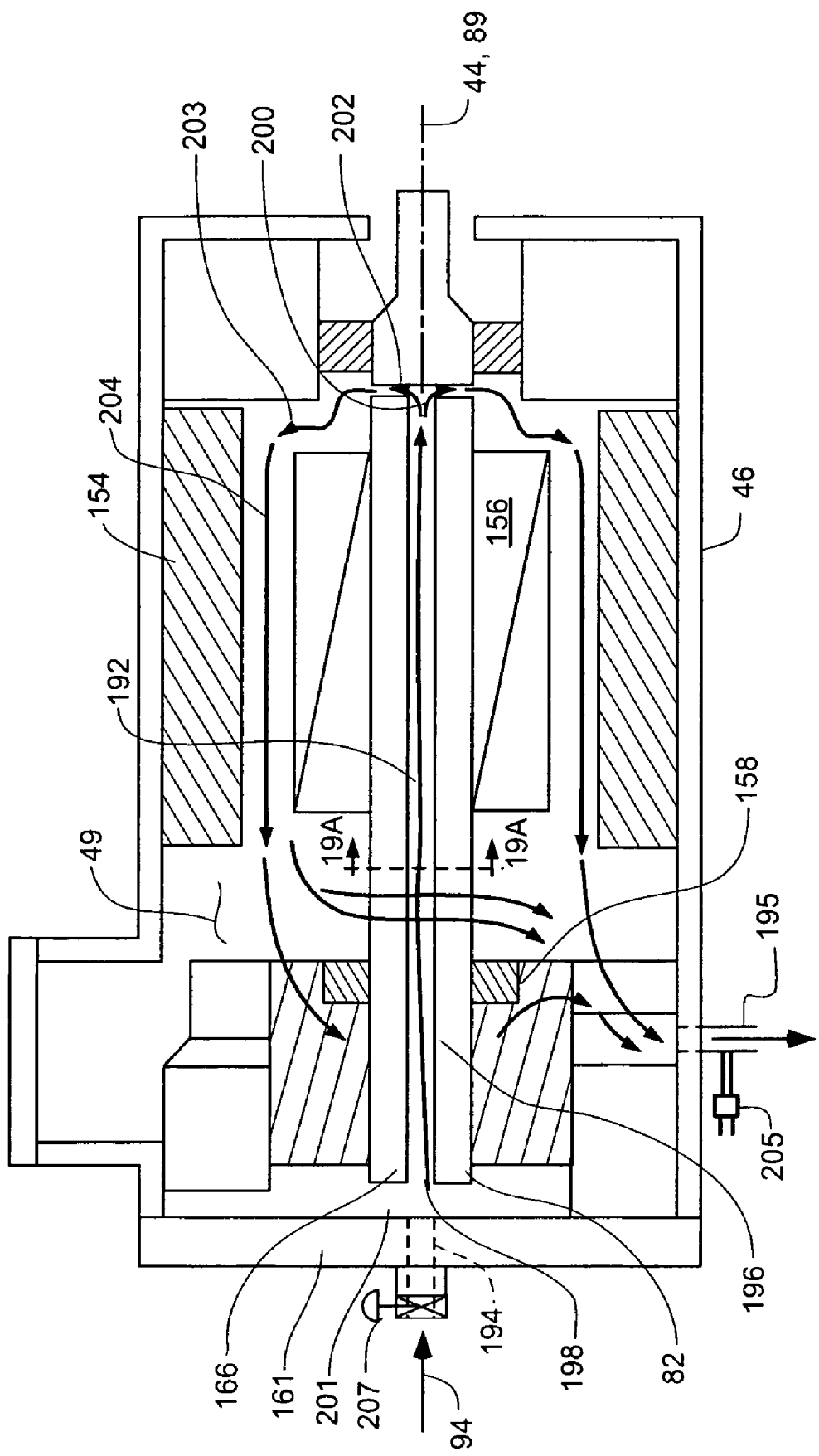

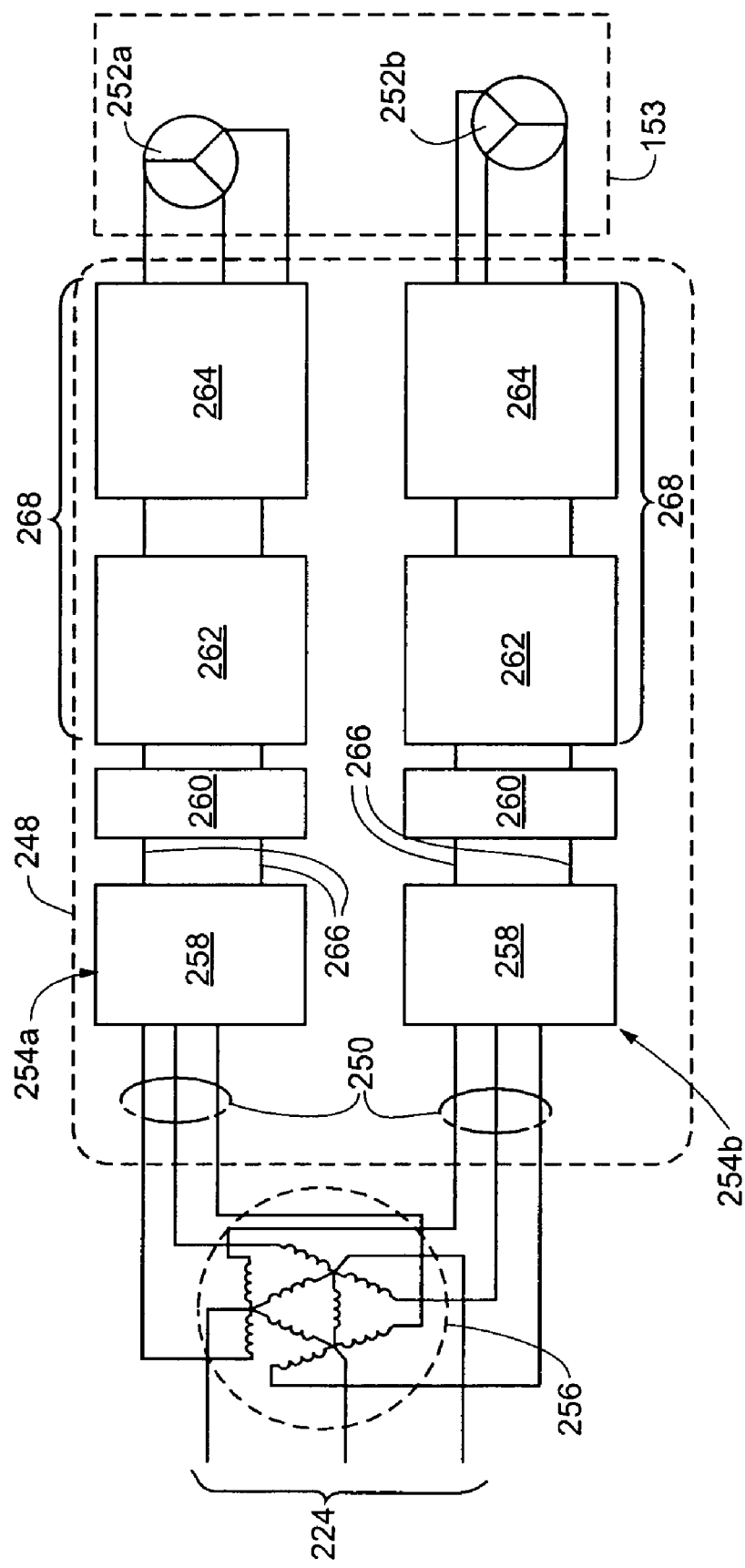

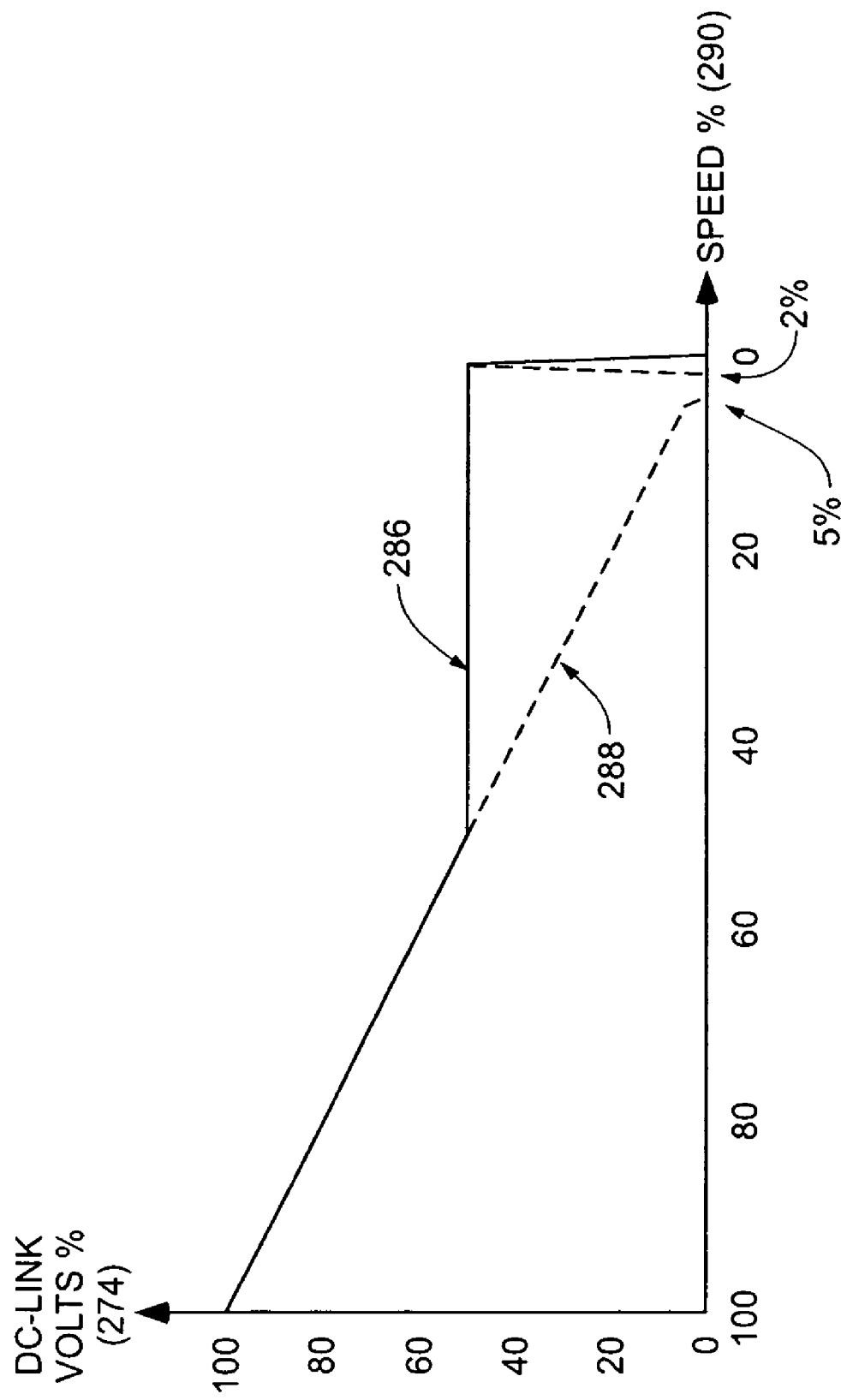

HIGH CAPACITY CHILLER COMPRESSOR

RELATED APPLICATION

This application claims the benefit of U.S. Provisional Application No. 60/849,865 filed Oct. 6, 2006, which is hereby fully incorporated by reference.

FIELD OF THE INVENTION

This invention relates generally to the field of compressors. More specifically, the invention is directed to large capacity compressors for refrigeration and air conditioning systems.

BACKGROUND ART

Large cooling installations, such as industrial refrigeration systems or air conditioner systems for office complexes, often involve the use of high cooling capacity systems of greater than 400 refrigeration tons (1400 kW). Delivery of this level of capacity typically requires the use of very large single stage or multi-stage compressor systems. Existing compressor systems are typically driven by induction type motors that may be of the hermetic, semi-hermetic, or open drive type. The drive motor may operate at power levels in excess of 250 kW and rotational speeds in the vicinity of 3600 rpm. Such compressor systems typically include rotating elements supported by lubricated, hydrodynamic or rolling element bearings.

The capacity of a given refrigeration system can vary substantially depending on certain input and output conditions. Accordingly, the heating, ventilation and air conditioning (HVAC) industry has developed standard conditions under which the capacity of a refrigeration system is determined. The standard rating conditions for a water-cooled chiller system include: condenser water inlet at 29.4° C. (85° F.), 0.054 liters per second per kW (3.0 gpm per ton); a water-side condenser fouling factor allowance of 0.044 $m^2$-° C. per kW (0.00025 hr-$ft^2$-° F. per BTU); evaporator water outlet at 6.7° C. (44.0° F.), 0.043 liters per second per kW (2.4 gpm per ton); and a water-side evaporator fouling factor allowance of 0.018 $m^2$-° C. per kW (0.0001 hr-$ft^2$-° F. per BTU). These conditions have been set by the Air-Conditioning and Refrigeration Institute (ARI) and are detailed in ARI Standard 550/590 entitled "2003 Standard for Performance Rating of Water-Chilling Packages Using the Vapor Compression Cycle," which is hereby incorporated by reference other than any express definitions of terms specifically defined. The tonnage of a refrigeration system determined under these conditions is hereinafter referred to as "standard refrigeration tons."

In a chiller system, the compressor acts as a vapor pump, compressing the refrigerant from an evaporation pressure to a higher condensation pressure. A variety of compressors have found utilization in performing this process, including rotary, screw, scroll, reciprocating, and centrifugal compressors. Each compressor has advantages for various purposes in different cooling capacity ranges. For large cooling capacities, centrifugal compressors are known to have the highest isentropic efficiency and therefore the highest overall thermal efficiency for the chiller refrigeration cycle. See U.S. Pat. No. 5,924,847 to Scaringe, et al.

In general terms, the compressor comprises an aerodynamic section, a drive train and a control system. The type of aerodynamic section employed depends on several factors including the refrigerant, the required pressure ratio, and the capacity range. The aerodynamic section may have one impeller (single stage) or multiple impellers (multi-stage). A single stage compressor is well suited for comfort cooling applications where the pressure ratio is typically less than 3 and equipment cost is important. Single stage compressors are typically characterized by a consistent cycle efficiency across a broad operating range in comparison to multi-stage compressors.

In a multi-stage compressor, each stage increases pressure of the compressed gas from the exit of the previous stage. Multi-stage compressors can be outfitted with an economizer (aka "intercooler") to provide a cycle efficiency that is higher than single stage compressors across a narrow operating range, but with added cost and complexity. See "Heating, Ventilating and Air Conditioning Systems and Equipment," 1996 ASHRAE Handbook (Inch-Pound Edition) and "Fundamentals," 2005 ASHRAE Handbook (Inch-Pound Edition), both of which are hereby incorporated by reference herein other than any express definitions of terms specifically defined. The greater the pressure ratio required, the greater the efficiency benefit from a multi-stage compressor. Cost is increased due to larger size, the need for a higher quantity of precision components (e.g. multiple impellers, deswirl vanes) and the additional piping and components for the economizer.

The compressor impeller can be either directly driven by the motor or driven through a speed increasing gear set. For high-pressure refrigerants such as HFC-134a, impeller rotational speeds may exceed 3600 revolutions per minute (rpm). Because standard induction motors spin at a maximum of 3600 rpm at a 60 Hz line frequency, a geared speed increaser may be needed to reach rotational speeds exceeding 3600 rpm. The geared speed increaser introduces inefficiencies, including the energy losses that occur in the power transmission through the gears and the viscous losses to the oil.

Alternately, an induction motor can be driven above 3600 RPM synchronous speed by a Variable Frequency Drive (VFD). However, the heat losses attendant the induction principle and resulting inefficiency become excessive when rotating at the high speeds required for refrigerants such as R-134a.

The use of magnetic bearings for enhanced efficiency of a compressor drive system is known. For example, U.S. Pat. No. 5,857,348 to Conry (Conry) discloses the use of active magnetic radial and axial bearings in a centrifugal compressor. Conventional compressor systems utilize hydrodynamic or rolling element bearings wherein the shaft journal is in contact with the rolling elements or a lubricant. Magnetic bearings eliminate such rolling contact or lubricant shear forces and thus characteristically have less drag than lubrication-based bearings.

However, magnetic bearings may be subjected to contact damage whenever the bearing loses power. Such power loss may be routine (and therefore designed around), such as during shut down of the compressor. But some losses of power are unanticipated, such as a power outage or other interruption in power service. In either case, undesired contact can occur, and may result in damage to the bearings or other components that are sensitive to the close alignment tolerances provided by the magnetic bearing levitation.

The conventional wisdom with respect to the design of magnetic bearing, direct drive centrifugal refrigeration compressors is that development of substantially greater capacities is not feasible in a single compressor because of the higher shaft masses and diameters (i.e. higher polar moments of inertia) and power densities.

Another concern in the implementation of magnetic bearings is failure of the bearing controller itself. Often, failure of the bearing controller will result in damage to the rotating components due to uncontrolled movement.

Many high capacity chiller systems feature a motor that operates at a constant operating rotational speed. The operating speed is chosen based on optimum performance at or near full load. However, more advanced control methods often involve frequent operation of the chiller at less than full capacity. The operation of a fixed speed compressor at less than full capacity introduces inefficiencies.

In a centrifugal compressor, refrigerant is motivated through the cooling system by an impeller. Current production impellers often utilize a tapered bore as the means for mounting the impeller to the high-speed shaft. This mounting configuration is inexpensive and has been used successfully for many years. However, there are some inherent problems with the tapered bore mount. For example: (1) alignment of the impeller and shaft is difficult and time consuming; (2) the mounted axial location of the impeller is not repeatable, varying slightly each time the impeller is mounted; and (3) the shaft and impeller combination may require rebalancing after each assembly.

Typically, the motor driving the compressor is actively cooled, especially with high power motors. With chiller systems, the proximity of refrigerant coolant to the motor often makes it the medium of choice for cooling the motor. Many systems feature bypass circuits designed to adequately cool the motor when the compressor is operating at full power and at an attendant pressure drop through the bypass circuit. Other compressors, such as disclosed by Conry, link coolant flow through the bypass circuit to a throttling device that regulates the flow of refrigerant into the compressor. Furthermore, U.S. Patent Application Publication 2005/0284173 to de Larminat discloses the use of vaporized (uncompressed) refrigerant as the cooling medium. However, such bypass circuits suffer from inherent shortcomings.

Some systems cool several components in series, which limits the operational range of the compressor. The cooling load requirement of each component will vary according to compressor cooling capacity, power draw of the compressor, available temperatures, and ambient air temperatures. Thus, the flow of coolant may be matched properly to only one of the components in series, and then only under specific conditions, which can create scenarios where the other components are either over-cooled or under cooled. Even the addition of flow controls cannot mitigate the issues since the cooling flow will be determined by the device needing the most cooling. Other components in the series will be either under-cooled or over cooled. Over cooled components may form condensation if exposed to ambient air. Under-cooled devices may exceed their operational limits resulting in component failure or unit shut down.

Large chiller systems often have specific maintenance requirements related to oiling systems. Where rolling element or hydrodynamic bearings are used, the bearings must be provided with lubrication. Likewise, any gearing that steps up or steps down the speed of the drive shaft must also be provided with lubrication. The oil system provides lubrication to these components, which requires ancillary equipment such as an oil reservoir, a pump, a recirculation loop, an oil heater (to keep the oil viscosity low in the winter months), and an oil cooler (to prevent overheating of the oil in the summer months). These components typically require periodic maintenance such as filter replacement, seal replacement, oil quality sampling, oil replacement and repair of the pump, heater and cooler. The oiling system shares a common atmosphere with the refrigeration components, which typically introduces oil into the refrigerant and can have a detrimental effect on heat transfer. Furthermore, components such as the pump, heater, cooler and recirculation loop may require isolation from ambient atmosphere, which introduces the potential for leak points in the overall refrigeration system.

In order to replace internal compressor components, existing compressor designs often require removal or disassembly of other compressor components that are not scheduled for or otherwise do not require servicing. Reassembly often requires precision alignment procedures that are time consuming and alter the performance of the unit if done incorrectly. In addition, the aerodynamic and motor housings are often contained in a single cast structure, which reduces the ability to change or upgrade aerodynamic components since the size is limited to the existing casting size.

Another characteristic of existing large capacity centrifugal compressors designs is the weight of the assembly. For example, the rotor of a typical induction motor can weigh hundreds of pounds, and may exceed 1000 pounds. Also, as systems are developed that exceed existing horsepower and refrigerant tonnage capacity, the weight of such units may become problematic with regard to shipping, installation and maintenance. When units are mounted above ground level, weight may go beyond problematic to prohibitive because of the expense of providing additional structural support.

There is a long felt need in the HVAC industry to increase the capacity of chiller systems. Evidence of this need is underscored by continually increasing sales of large capacity chillers. In the year 2006, for example, in excess of 2000 chiller systems were sold with compressor capacities greater than 200 standard refrigeration tons. Accordingly, the development of a compressor system that overcomes the foregoing design challenges for delivery of refrigeration capacities substantially greater than the existing or previously commercialized systems would be welcome.

SUMMARY OF THE INVENTION

The various embodiments of the invention include single stage and multi-stage centrifugal compressor assemblies designed for large cooling installations. The design enhances power output and efficiency, improves reliability and reduces maintenance requirements.

The variables in designing a high capacity chiller compressor include the diameter and length of the rotor and stator assemblies and the materials of construction. A design tradeoff exists with respect to the diameter of the rotor assembly. On the one hand, the rotor assembly has to have a large enough diameter to meet the torque requirement. On the other hand, the diameter should not be so great as to generate surface stresses that exceed typical material strengths when operating at high rotational speeds, which may exceed 11,000 rpm in certain embodiments of the invention, approaching 21,000 rpm in some instances. Also, larger diameters and lengths of the rotor assembly may produce aerodynamic drag forces (aka windage) proportional to the length and to the square of the diameter of the rotor assembly in operation, resulting in more losses. The larger diameters and lengths may also tend to increase the mass and the moment of inertia of the rotor assembly when standard materials of construction are used.

Reduction of stress and drag tends to promote the use of smaller diameter rotor assemblies. To produce higher power capacity within the confines of a smaller diameter rotor assembly, some embodiments of the invention utilize a permanent magnet (PM) motor. Permanent magnet motors are well suited for operation above 3600 rpm and exhibit the highest demonstrated efficiency over a broad speed and torque range of the compressor. PM motors typically produce more power per unit volume than do conventional induction motors and are well suited for use with VFDs. Additionally, the power factor of a PM motor is typically higher and the heat generation typically less than for induction motors of comparable power. Thus, the PM motor provides enhanced energy efficiency over induction motors.

However, further increase in the power capacity within the confines of the smaller diameter rotor assembly creates a higher power density with less exterior surface area for the transfer of heat generated by electrical losses. Accordingly, large cooling applications such as industrial refrigeration systems or air conditioner systems that utilize PM motors are typically limited to capacities of 200 standard refrigeration tons (700 kW) or less.

To address the increase in power density, various embodiments of the invention utilize refrigerant gas from the evaporator section to cool the rotor and stator assemblies. Still other embodiments further include internal cooling of the motor shaft, which increases the heat transfer area and can increase the convective coupling of the heat transfer coefficient between the refrigerant gas and the rotor assembly.

In various embodiments of the invention, the components of the drive system are designed to improve overall energy efficiency. Some or all of the aforementioned energy loss mechanisms (e.g. aerodynamic efficiency, motor efficiency, gear losses and bearing frictional losses) may be addressed for higher compressor efficiency. Moreover, the proposed compressor design delivers cooling capacities exceeding 800 standard refrigeration tons—a marked improvement in capacity over currently existing systems, which stands at less than 200 standard refrigeration tons for direct drive compressors utilizing magnetic bearings. Thus, various embodiments of invention reduces the number of compressors required for large (greater than 200 standard refrigeration tons) cooling installations.

A variable frequency drive (VFD, aka variable speed drive, or VSD) may be used to vary compressor speed to match the load requirements, thereby improving energy efficiency at part load conditions.

In certain embodiments, the impeller is driven directly by the motor, eliminating the need for gearing and attendant energy losses and maintenance requirements. The impeller may be designed for optimum or near optimum use with refrigerant gases and has a wide operating range with nearly constant efficiency.

Various embodiments also include oil free, magnetic bearings for support of the motor shaft, thereby reducing friction losses otherwise associated with the use of hydrodynamic or rolling element bearings. An intermediate DC power supply system provides regenerative power for the magnetic bearings. Power may be generated by the back-emf produced by the motor as the rotor coasts to a stop, thus providing control of the bearings in the event of a power loss or interruption. A backup bearing system may also be implemented to provide support for the rotating assembly in the absence of sufficient power to the magnetic bearings.

The PM motor provides a further advantage in terms of unit efficiency. When matched with a VFD, the PM motor can rotate faster than 3600 rpm thus eliminating the need for gearing to increase the rotational speed and the attendant gear transfer losses. The VFD and permanent magnet motor may also be matched to provide high efficiency for the speed and torque demanded by the compressor.

The compressor may be configured to include a cooling system that cools the motor shaft/rotor assembly and the stator assembly independently, avoiding the disadvantages inherent to serial cooling of these components. Each circuit may be adaptable to varying cooling capacity and operating pressure ratios that maintains the respective components within temperature limits across a range of speeds without over-cooling or under-cooling the motor. Embodiments include a cooling or bypass circuit that passes refrigerant gas through the motor shaft as well as over the outer perimeter of the rotor assembly, thereby cooling the rotor assembly by direct conduction to the shaft and by convection over the outer perimeter.

The compressor assembly may be constructed in a modular fashion to facilitate easier maintenance of the unit and to provide a large degree of aerodynamic flexibility. The aerodynamic section can be completely separated from the motor housing, enabling use of the drive train with a variety of aerodynamic sections that may vary in size or in the number of stages. In this way, one can service or upgrade of the unit without need for replacing the drive train or other components that can be shared by the two configurations. Compressor components can be interchanged as chiller performance requirements change and/or as components are redesigned for higher efficiencies. For example, one can match the motor assembly to a variety of aerodynamic assemblies for best match of impeller or volute shape to the load. The modular construction can also simplify the parts inventory fabricated and retained by chiller manufacturers.

An embodiment of the invention includes an inlet guide vane system for controlling the inlet flow to the compressor. The guide vanes are actuated by a stepper motor and may include rotational orientation sensors for feedback control. The actuation gearing can be fabricated from polymer materials that are self lubricating, and thus do not require oil lubrication.

Oil-free gearing in the inlet guide vanes, coupled with oil-free magnetic bearings and the elimination of drive shaft gearing to enhance the rotational speed of the compressor can eliminate the need for an oiling system and the attendant maintenance.

Various embodiments comprise castings that are designed for ready reconfiguration. The discharge nozzle may be rotated to provide flexibility in chiller design. Time saving aspects regarding the assembly of the invention include: an impeller that may be removed and replaced without removing the discharge nozzle; easy alignment of the impeller eye seal with the impeller housing; removal and replacement of an inlet guide vane system that may also be performed without removing the discharge nozzle; and an impeller mount that provides easy and repeatable alignment between the impeller and the motor shaft or other drive shaft. Certain embodiments are also free of the use of dynamic o-ring seals, thereby reducing maintenance and lessening the potential for wear and damage during servicing.

The compressor may be fabricated from lightweight components and castings, providing a high power-to-weight ratio. The low weight components in a single stage design enables the same tonnage at approximately one-third the weight of conventional units. The weight reduction differences may be realized through the use of aluminum or aluminum alloy components or castings, elimination of gears, and a smaller motor.

Various embodiments also include a power supply that is adaptable to a wide range of voltage input levels through the use of an autotransformer. The power supply may also be equipped to attenuate the electrical harmonics transferred to the power grid.

The control system for the compressor may be designed such that the chiller controls, compressors control, bearing controls, and VFD communicate on a network that coordinates the data, alarms, set points, and control algorithms. The network may be a wired system such as Ethernet, a wireless system, or a combination of both.

In one embodiment, a chiller system is disclosed comprising a centrifugal compressor assembly for compression of a refrigerant gas and including a permanent magnet motor housed within a motor housing, the motor housing defining an interior chamber. The permanent magnet motor in this embodiment includes a motor shaft rotatable about a rotational axis, a rotor assembly operatively coupled with a portion of the motor shaft, and at least two magnetic bearings operatively coupled to the motor shaft. The motor shaft may include at least one longitudinal passage in fluid communication with at least one aspiration passage, the at least one longitudinal passage extending substantially parallel with the rotational axis through at least the portion of the motor shaft. In this embodiment, an evaporator section is in fluid communication with the at least one longitudinal passage for supply of the refrigerant gas that cools the motor shaft and the rotor assembly. The chiller system may further include an aerodynamic section operatively coupled to the motor shaft, the operative coupling may be by direct coupling. Also, permanent magnet motor may exceed 140 kW of power, may produce speeds in excess of 11,000 revolutions per minute, and may exceed a 200-ton refrigeration capacity at standard industry rating conditions.

Another embodiment of the invention is tailored to the high capacity, high efficiency aspects of the invention. This embodiment includes a permanent magnet motor having a motor shaft borne by magnetic bearings for low frictional losses, An aerodynamic section including at least one impeller directly coupled with the motor shaft for elimination of intermediate gearing and attendant mechanical transfer losses, and a variable frequency drive operatively coupled with the permanent magnet motor for matching a predetermined rotational speed of the impeller to correspond with a refrigeration load of the chiller system.

Still another embodiment provides a high capacity, oil free chiller system. This embodiment includes a permanent magnet motor having a motor shaft borne by oil free magnetic bearings; an aerodynamic section including at least one impeller directly coupled with the motor shaft for elimination of intermediate gearing; and an inlet guide vane assembly including gear portions comprising a self-lubricating material.

In another embodiment, a chiller system is disclosed with a compressor assembly including a permanent magnet motor and an aerodynamic section, the permanent magnet motor including a motor shaft, a rotor assembly and a stator assembly, the motor shaft being operatively coupled with at least two magnetic bearings. A condenser section may be in fluid communication with the compressor assembly, and an evaporator section may be in fluid communication with the condenser section and the compressor assembly. The compressor assembly may further include a rotor cooling circuit for removal of heat from the rotor assembly with a gas refrigerant, the rotor cooling circuit having a gas cooling inlet operatively coupled with the evaporator section and a gas cooling outlet operatively coupled with the evaporator section. The compressor assembly may also include a liquid cooling circuit having a liquid cooling inlet port operatively coupled with the condenser section and a liquid cooling outlet port operatively coupled with the evaporator section, the liquid cooling circuit being configured for cooling the stator assembly with a liquid refrigerant. A throttling device may be operatively coupled with the rotor cooling circuit for regulation of a flow rate of the refrigerant gas through the gas cooling circuit.

In yet another embodiment, a chiller system is disclosed that includes both a liquid bypass circuit and a gas bypass circuit. The liquid bypass circuit cools the stator assembly with a liquid refrigerant supplied by the condenser section and returned to the evaporator section, the liquid refrigerant being motivated through the liquid bypass circuit by the higher operating pressure of the condenser section relative to the evaporator section. The gas bypass circuit that cools the rotor assembly with a gas refrigerant, the gas refrigerant being drawn from the evaporator section and returned to the evaporator section by pressure differences caused by the rotation of the motor shaft.

Another configuration of the invention includes a modular aerodynamic section for chiller systems. In this embodiment, a discharge housing cooperates with a volute insert to define a volute. At least one impeller may be operatively coupled with the volute, the at least one impeller being operatively coupled with a drive shaft. A discharge nozzle can be operatively coupled with the discharge housing and in fluid communication with the volute, the discharge nozzle being selectively positioned with respect to the rotational axis of the drive shaft and operatively coupled to a downstream conduit. The at least one impeller and the volute insert in this embodiment are removable from the aerodynamic section while the discharge housing remains operatively coupled to the discharge nozzle and the discharge nozzle remains operatively coupled to the downstream conduit. The discharge housing may be operatively coupled to a motor housing. The impeller(s) and the volute insert may be comprised of an aluminum or aluminum alloy material.

In another embodiment, the modular concept is extended to the compressor assembly as a whole. In this embodiment, the compressor assembly includes a motor housing containing a motor, a motor shaft rotatable about a rotational axis and operatively coupled with the motor, and an aerodynamic section operatively coupled with the motor housing and the motor shaft. The aerodynamic section may include an inlet transition detachably coupled to an inlet conduit, the aerodynamic section defining a central axis in substantial alignment with the rotational axis of the motor shaft. In this embodiment, the at least one impeller, the inlet transition and the volute insert are removable from the aerodynamic section while the discharge housing, the inlet conduit, the motor housing and the discharge nozzle remain stationary. Also in this embodiment, the aerodynamic section is removable from the compressor assembly while the inlet conduit, the motor housing and the discharge nozzle remain stationary. The discharge nozzle may be selectively positioned with respect to the central axis.

Some embodiments include an inlet guide vane assembly for a chiller compressor assembly. In these configurations, a plurality of guide vane subassemblies for operation in an environment that includes a refrigerant gas may be operatively coupled to an inlet transition, each guide vane subassembly defining a respective axis of rotation and including a gear portion for rotation of the guide vane subassembly about the respective axis of rotation. A ring-shaped face gear may be operatively coupled with each of the gear portions of the plurality of guide vane subassemblies. A drive motor can be operatively coupled to rotate the ring-shaped face gear for rotation of each guide vane subassembly about the respective axis of rotation. The gear portions may comprising a self-lubricating material that is resistant to the refrigerant gas.

Another embodiment of the compressor assembly includes a 6-phase permanent magnet motor having a first set and a second set of three-phase windings that output a back electromotive force when the drive train is rotating. The compressor assembly further includes at least two magnetic bearings, the magnetic bearings being controlled by a magnetic bearing controller and being operatively coupled to levitate the motor shaft when a supply voltage that is greater than a threshold voltage is applied to the magnetic bearings. At least two backup rolling element bearings may be arranged to engage the motor shaft when the supply voltage is less than the threshold voltage. A first variable frequency drive and a second variable frequency drive may be operatively coupled with a first set and a second set of three-phase windings, respectively. An autotransformer operatively coupled to the first and the second variable frequency drives may provide a 30-degree phase shift between the first and second variable frequency drives, the 30-degree phase shift providing a 12-pulse input to the first and second variable frequency drives, the autotransformer being operatively coupled with a mains supply. An intermediate power supply may provide the supply voltage to the magnetic bearings and the magnetic bearing controller, the intermediate power supply being sourced by the mains supply when power is available from the mains supply, the intermediate power supply being sourced by the back electromotive force when the 6-phase permanent magnet motor is rotating and the mains supply is interrupted. The first and the second variable frequency drive may be current source type variable frequency drives.

In another embodiment, a method of assembling a compressor assembly is disclosed, the compressor assembly including a drive shaft operatively coupled with a motor, the motor being contained in a motor housing, the drive shaft having a drive end extending outside the motor housing. The method includes attaching a discharge housing to the motor housing such that the drive end of the motor shaft extends into the discharge housing, the motor discharge housing having an inlet transition and an exit transition, the motor housing remaining stationary. Other steps may include mounting an impeller to the drive end of the motor shaft, installing a volute insert into the discharge housing to form a volute, the volute insert being operatively coupled with the impeller, coupling an inlet housing with the inlet transition and coupling the exit transition with a downstream diffusion system, the downstream diffusion system remaining stationary.

BRIEF DESCRIPTION OF THE DRAWINGS

FIG. 19 is a cross-sectional view of the drive train assembly of FIG. 15 highlighting a gas bypass circuit for the rotor assembly of FIG. 18.

FIG. 21 is an electrical schematic of a VFD with 6 output phases and a phase shifting autotransformer input power source in an embodiment of the invention.

FIG. 23 is a graph of the DC-link voltage supply as a function of the rotational speed of a permanent magnet motor in an embodiment of the invention.

DETAILED DESCRIPTION OF THE EMBODIMENTS

Figure 1:
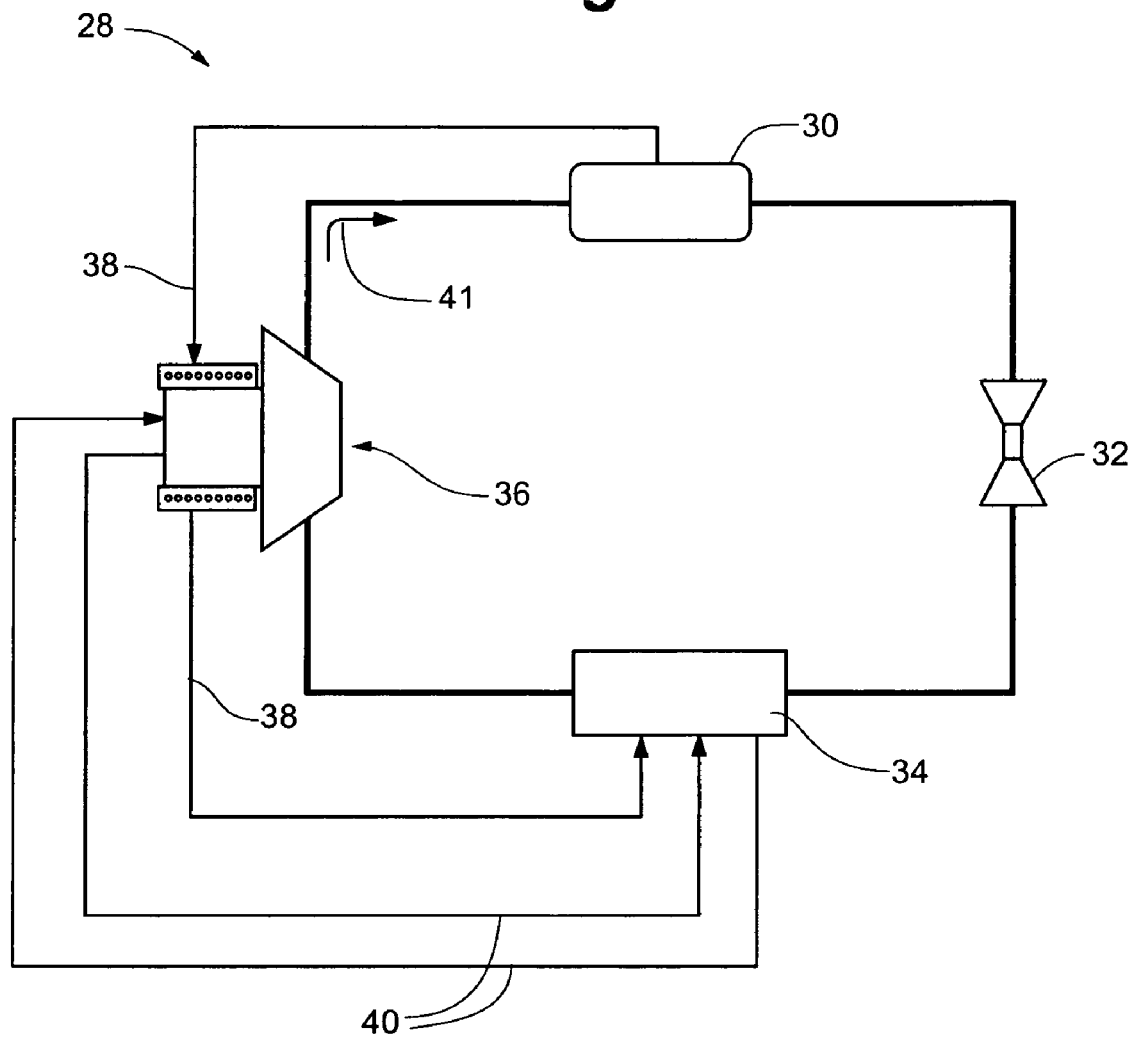
FIG. 1 is a schematic of a chiller system in an embodiment of the invention.
Figure 2:
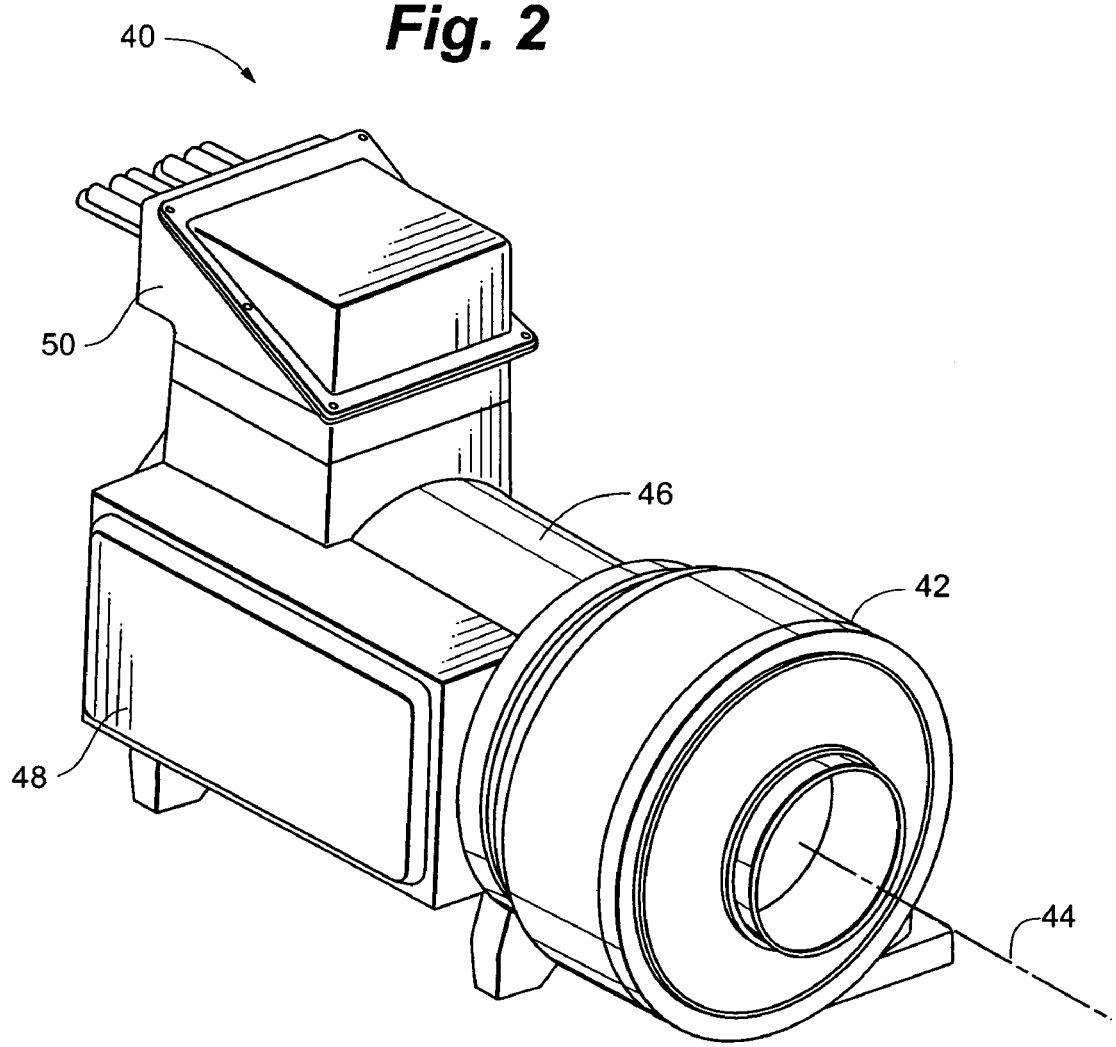
FIG. 2 is a perspective view of a compressor assembly in an embodiment of the invention.
Figure 3:
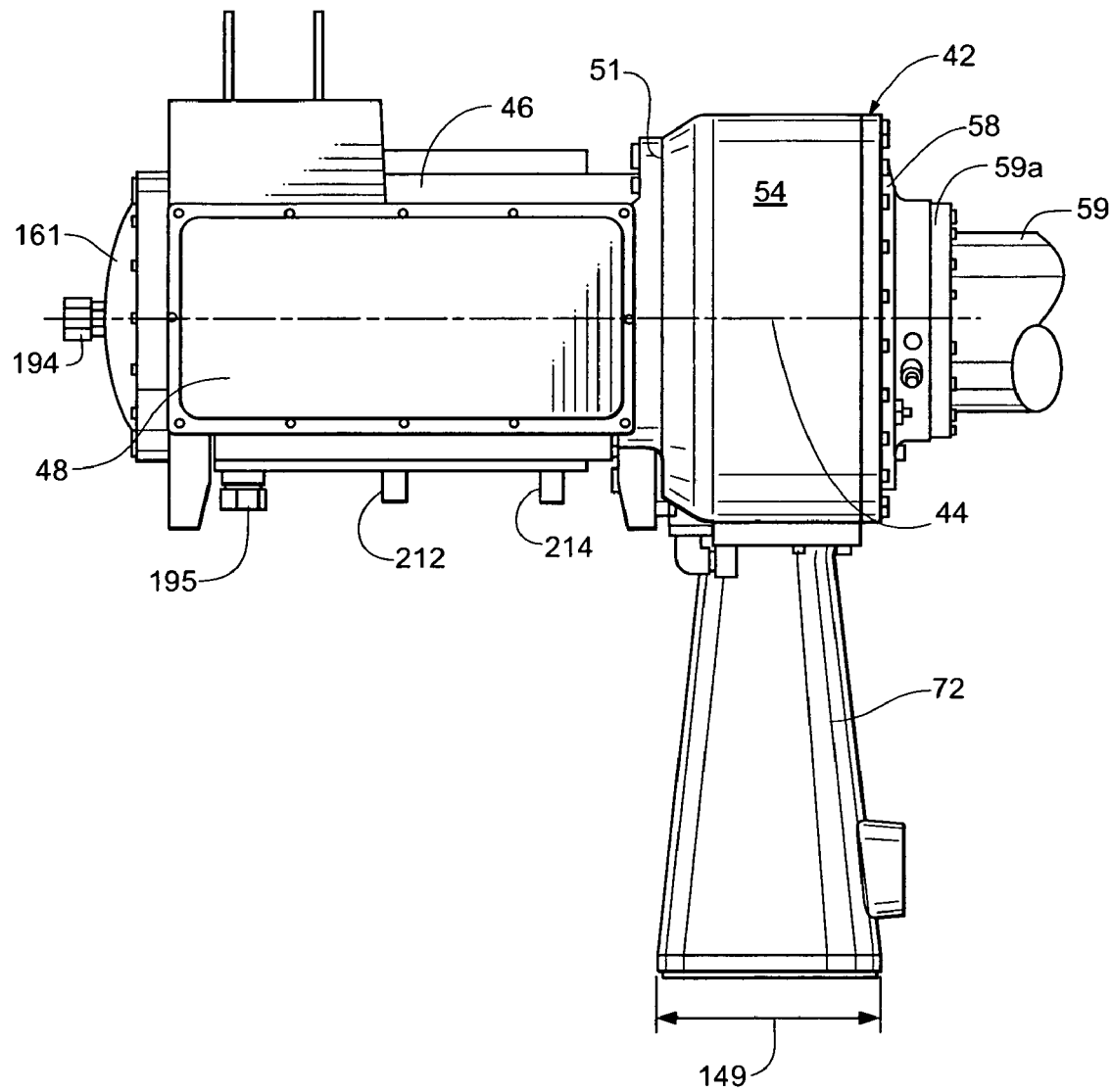
FIG. 3 is an elevation view of the compressor assembly of FIG. 2.
Figure 4:
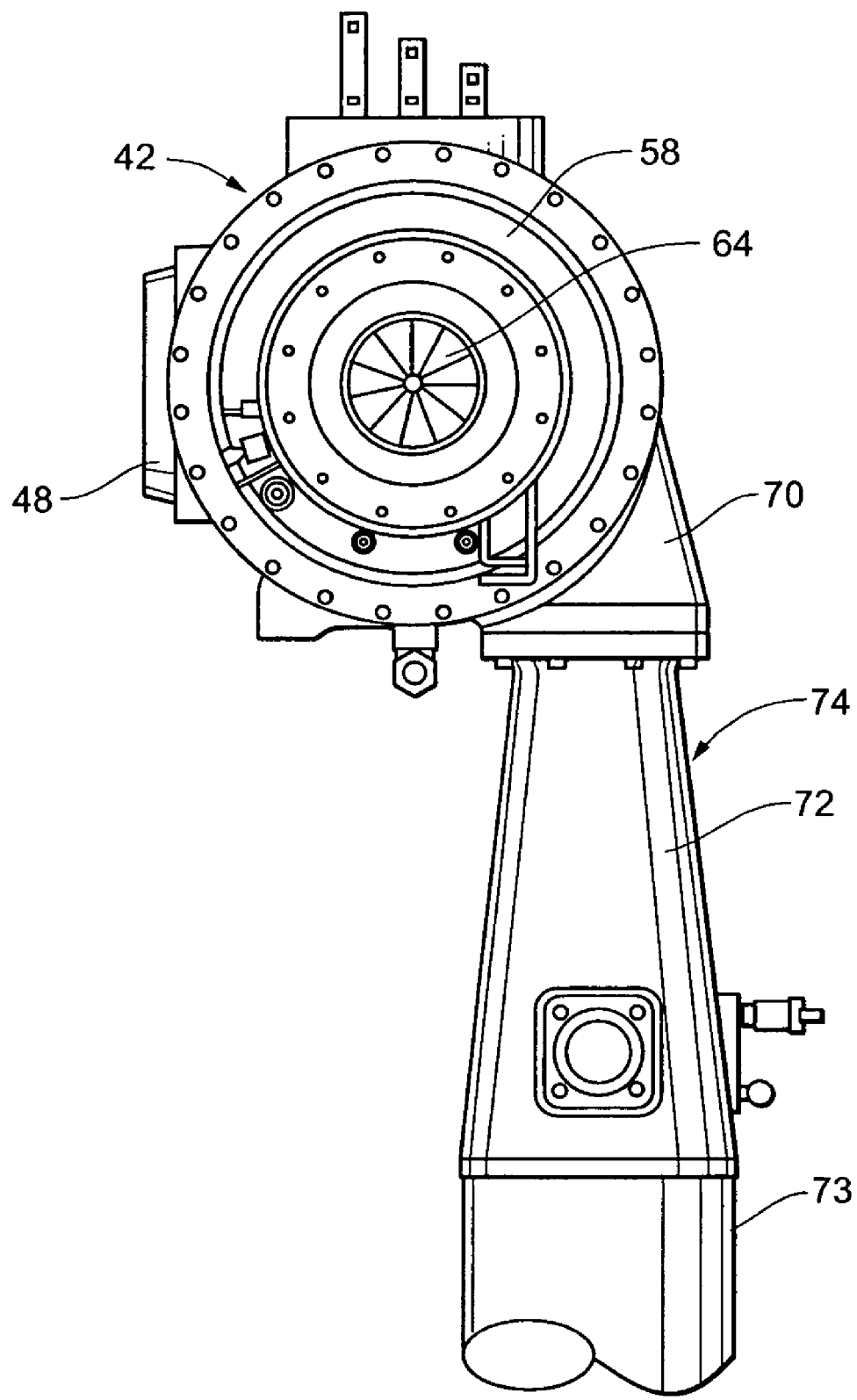
FIG. 4 is an end view of the inlet end of the compressor assembly of FIG. 2.
Figure 5:
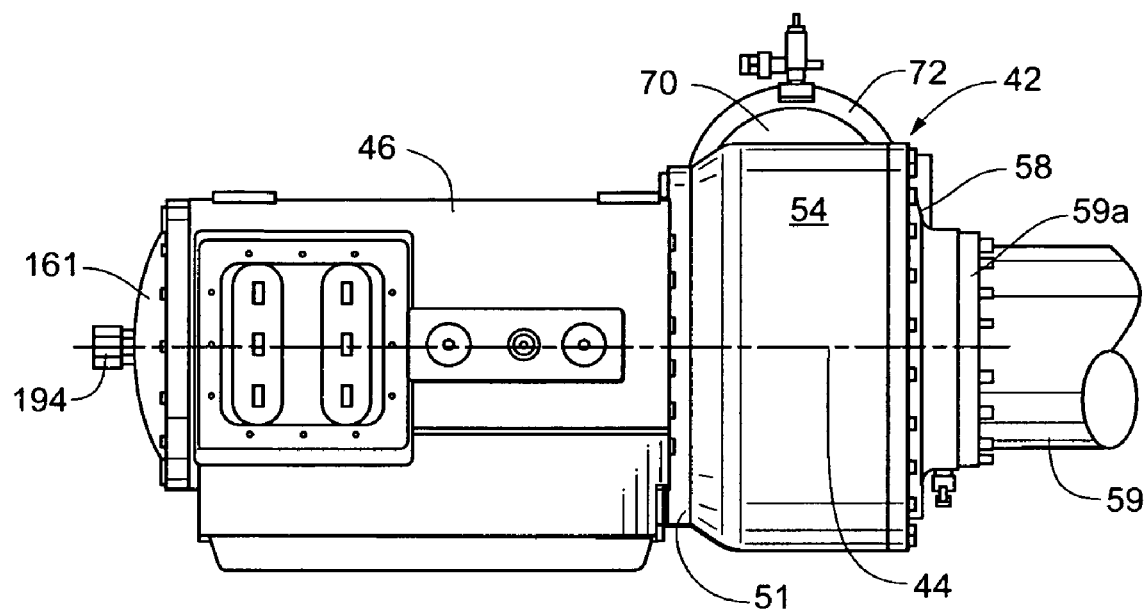
FIG. 5 is a top view of the compressor assembly of FIG. 2.
Figure 6:
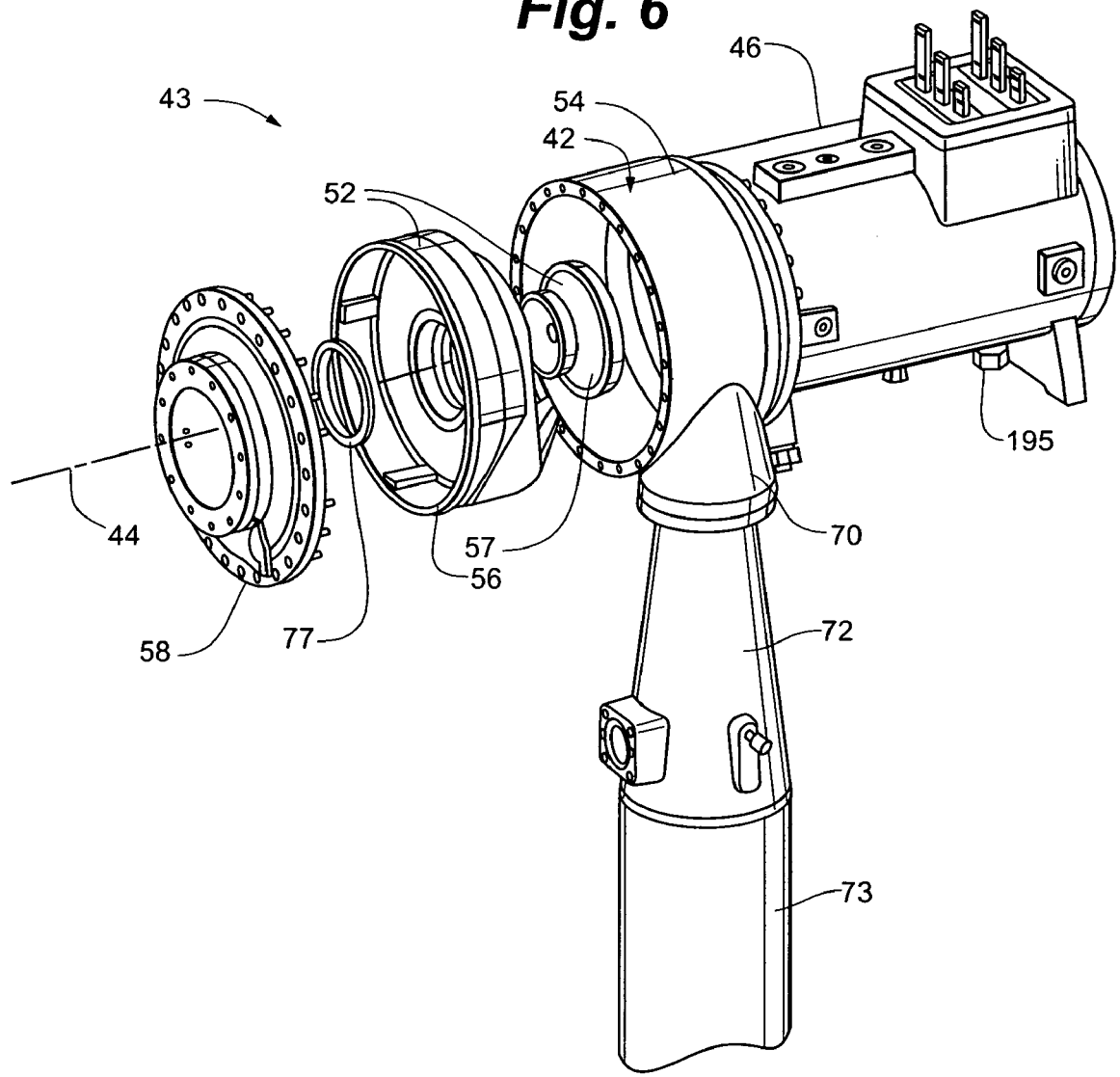
FIG. 6 is a partial exploded view of the compressor assembly of FIG. 2.

Referring to FIG. 1, a chiller system 28 having a condenser section 30, an expansion device 32, an evaporator section 34 and a centrifugal compressor assembly 36 is depicted in an embodiment of the invention. The chiller system 28 may be further characterized by a gas bypass circuit 38 and liquid bypass circuit 40 for cooling various components of the centrifugal compressor assembly 36.

In operation, refrigerant within the chiller system 28 is driven from the centrifugal compressor assembly 36 to the condenser section 30, as depicted by the directional arrow 41, setting up a clockwise flow as to FIG. 1. The centrifugal compressor assembly 36 causes a boost in the operating pressure of the condenser section 30, whereas the expansion device 32 causes a drop in the operating pressure of the evaporator section 34. Accordingly, a pressure difference exists during operation of the chiller system 28 wherein the operating pressure of the condenser section 30 may be higher than the operating pressure of the evaporator section 34.

Referring to FIGS. 2 through 9, an embodiment of a centrifugal compressor assembly 36 according to the invention is depicted. The centrifugal compressor assembly 36 includes an aerodynamic section 42 having a central axis 44, a motor housing 46, an electronics compartment 48 and an incoming power terminal enclosure 50. The motor housing 46 generally defines an interior chamber 49 for containment and mounting of various components of the compressor assembly 36. Coupling between the motor housing 46 and the aerodynamic section 42 may be provided by a flanged interface 51.

Aerodynamic Section

Figure 7:
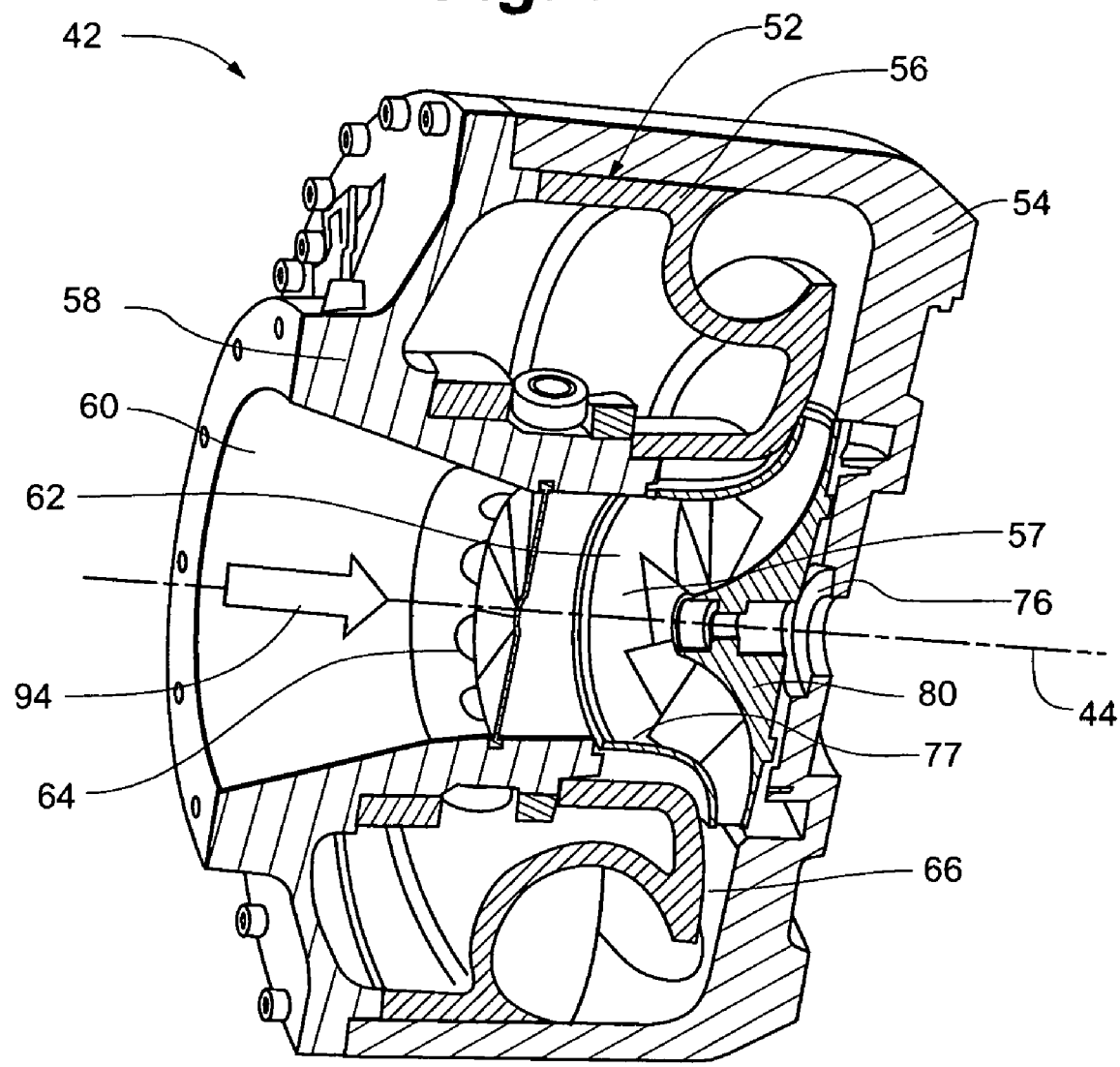
FIG. 7 is a perspective cut away view of an aerodynamic section of a single stage compressor assembly in an embodiment of the invention.
Figure 8:
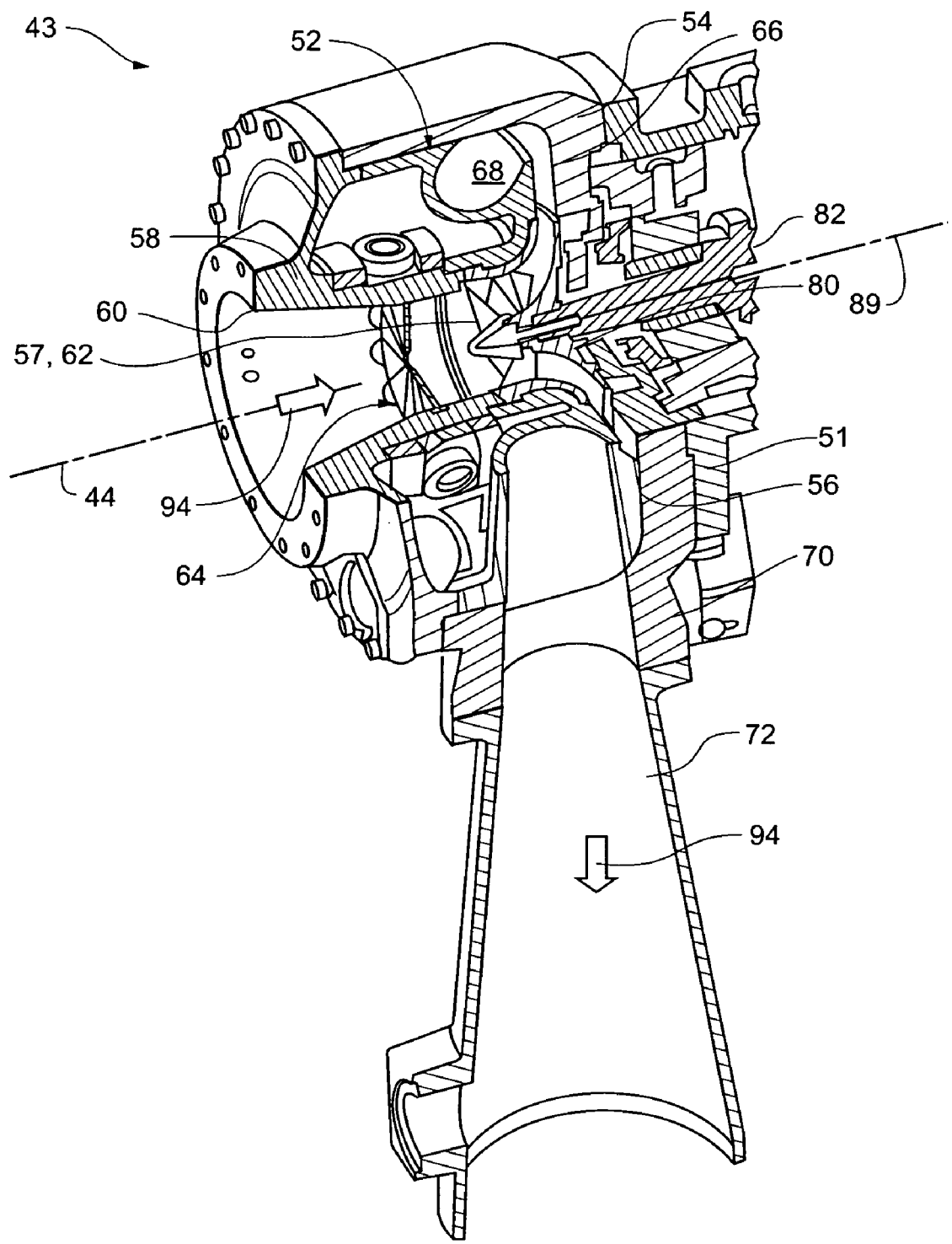
FIG. 8 is a perspective cut away view of the aerodynamic section of FIG. 7.
Figure 9:
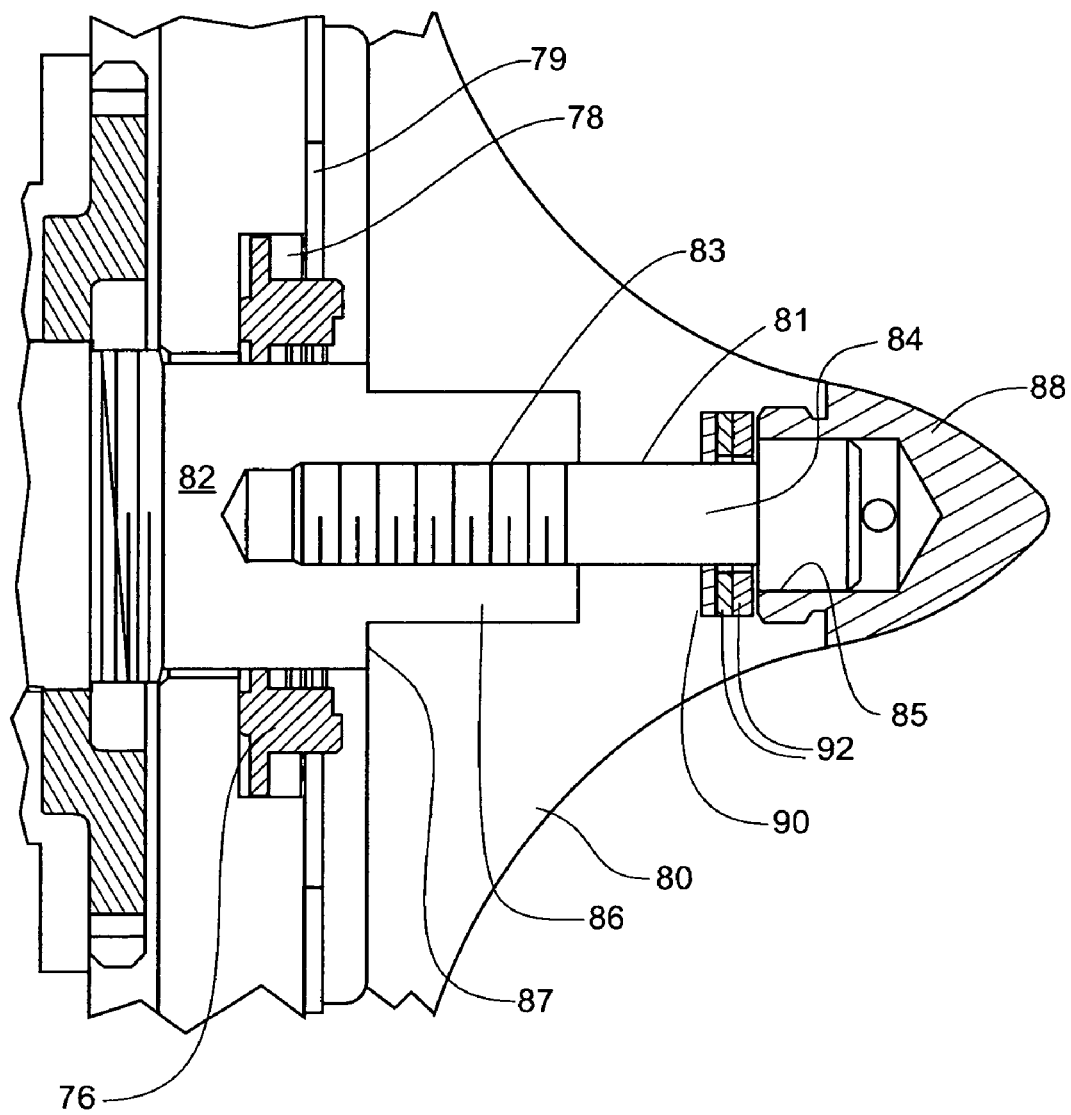
FIG. 9 is a cross-sectional view of an impeller mounted to a drive shaft in an embodiment of the invention.

In one embodiment, the aerodynamic section 42 of a single stage compressor 43, best portrayed in FIGS. 7 through 9, contains a centrifugal compressor stage 52 that includes a volute insert 56 and an impeller 80 within an impeller housing 57. The centrifugal compressor stage 52 may be housed in a discharge housing 54 and in fluid communication with an inlet housing 58.

The inlet housing 58 may provide an inlet transition 60 between an inlet conduit 59 and an inlet 62 to the compressor stage 52. The inlet conduit 59 may be configured for mounting to the inlet transition 60 with a flange 59a. The inlet housing 58 can also provide structure for supporting an inlet guide vane assembly 64 and serves to hold the volute insert 56 against the discharge housing 54.

In some embodiments, the volute insert 56 and the discharge housing 54 cooperate to form a diffuser 66 and a volute 68. The discharge housing 54 can also be equipped with an exit transition 70 in fluid communication with the volute 68. The exit transition 70 can be interfaced with a discharge nozzle 72 that transitions between the discharge housing 54 and a downstream conduit 73 (FIGS. 3 through 5) that leads to the condenser section 30. A downstream diffusion system 74 may be operatively coupled with the impeller 80, and may comprise the diffuser 66, the volute 68, transition 70 and the discharge nozzle 72. The aerodynamic section 42 can also include a shaft seal 76 and an impeller eye seal 77. The shaft seal 76 may be held in place by a wave spring 78 and retaining ring 79.

The discharge nozzle 72 may be made from a weldable cast steel such as ASTM A216 grade WCB. The various housings 54, 56, 57 and 58 may be fabricated from steel, or from high strength aluminum alloys or light weight alloys to reduce the weight of the compressor assembly 36.

Functionally, the flanged interface 51 enables the discharge housing 54 to be mounted to the motor housing 46 with the discharge nozzle 72 selectively positioned relative to the central axis 44. In some cases, the selective positioning of the discharge nozzle 72 enables the aerodynamic section 42 to be connected to the condenser section 30 without resort to excessive lengths of downstream conduit 73 or an excessive number of turns in the downstream conduit 73. The reduction in the length and number of turns in the downstream conduit 73 generally results in the reduction of attendant head losses in the chiller system 28, thus promoting more energy efficient operation. The selective positioning also enables certain embodiments of the invention to be more readily applied to a variety of evaporator and condenser designs that are better suited to unique discharge angles.

Impeller

For various embodiments, an impeller 80 can be disposed between the inlet 62 and the diffuser 66 in the impeller housing 57, as depicted in FIGS. 7 and 8. The impeller 80 may include a through bore 81 that enables the impeller 80 to be mounted to a drive shaft such as a motor shaft 82. The motor shaft 82 is characterized by a rotational axis 89. A tie bolt 84 may be used to couple the impeller 80 to the motor shaft 82. The tie bolt 84 be engaged with a threaded tap 83, and the cap of the tie bolt 84 seated within a front counterbore 85 on the nose of the impeller 80, as portrayed in FIG. 9. The threaded tap 83 and tie bolt 84 may be of either a left hand or a right hand thread. The impeller 80 may also be formed to mate with a protruding portion 86 that extends from a shoulder portion 87 of the motor shaft 82. The combination of a flat washer 90 and a spring washer or washers 92 may be implemented in the front counterbore 85 between the tie bolt 84 and the impeller 80. A nose cone 88 may be placed over the tie bolt 84 and the front counterbore 85.

The embodiments depicted in FIGS. 1 through 9 are configured with the impeller 80 coupled directly with the motor shaft 82, thus negating the need for a separate drive shaft and attendant gearing and structure. In this embodiment, the rotational axis 89 of the motor shaft 82 defines the central axis 44 of the aerodynamic section 42. Those skilled in the art will recognize that certain aspects of the disclosure can be applied to configurations including a drive shaft that is separate and distinct from the motor shaft 82.

Figure 11:
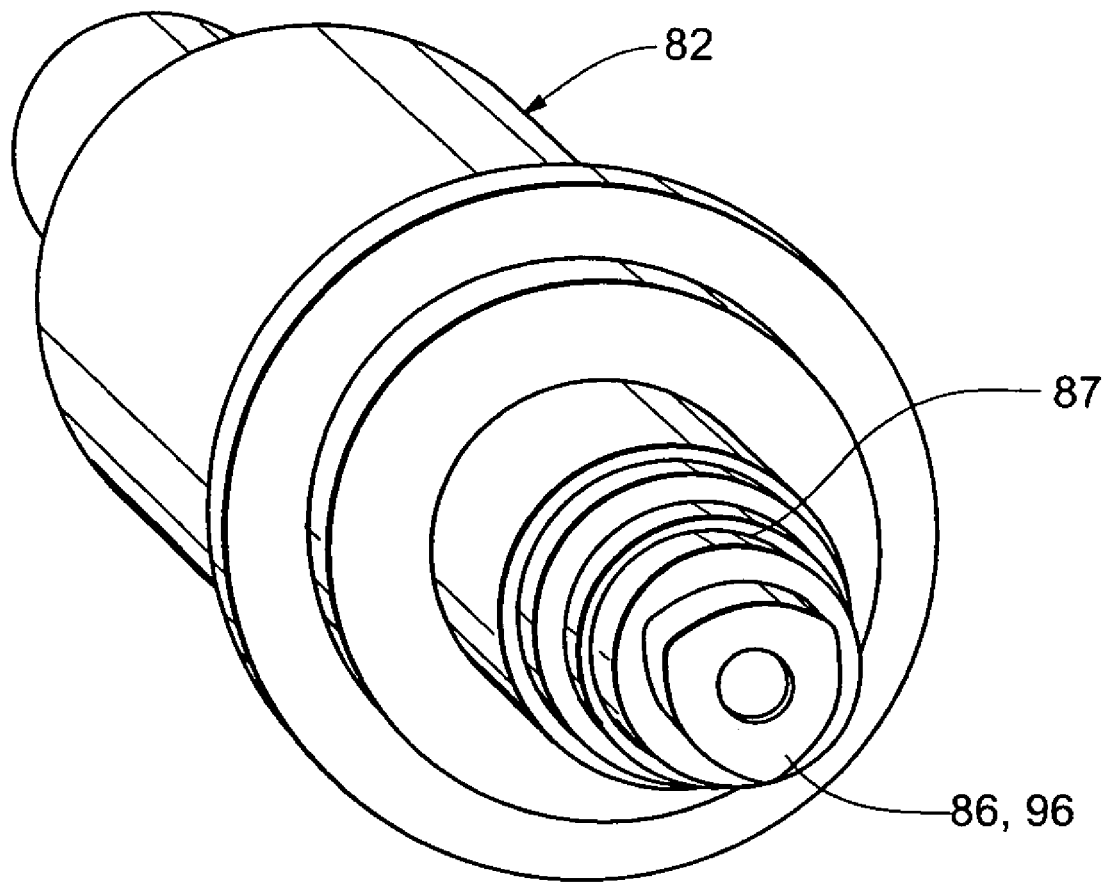
FIG. 11 is a perspective view of a motor shaft having a polygon type mount in an embodiment of the invention.

Referring to FIG. 11, the motor shaft 82 is depicted as having a protruding portion 86 comprising a polygon type mount 96 in an embodiment of the invention. The polygon type mount 96 is so named for its polygonal cross-section. Other impeller-mounting arrangements may be utilized, including but not limited to a curvic mount or a splined/v-tooth mount.

Figure 10:
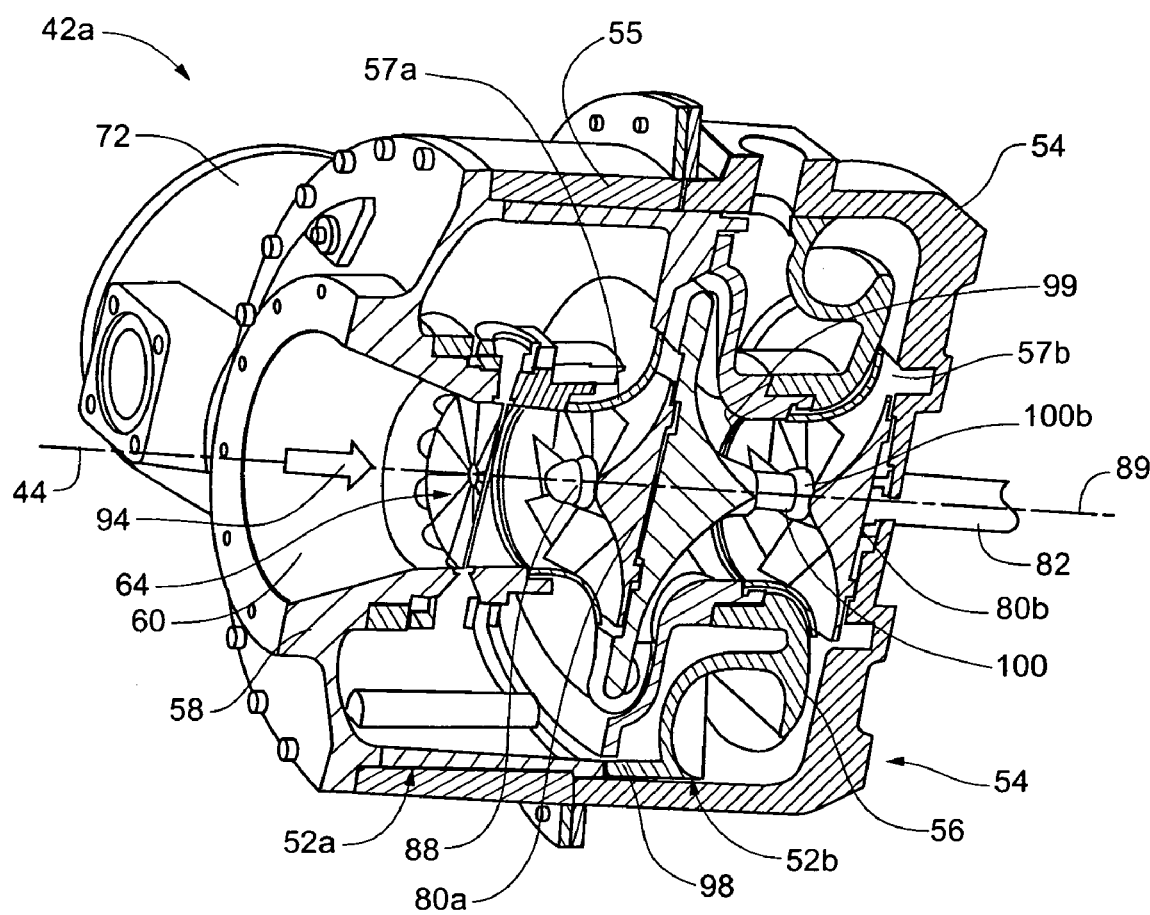
FIG. 10 is a perspective cut away view of a two stage compressor assembly in an embodiment of the invention.

Returning to FIGS. 9 and 11, the protruding portion 86 of the motor shaft 82 serves to align the impeller 80 with the central axis 44 in one embodiment. The spring washers 92 can help keep the tie bolt 84 in tension during operation. Also, the choice of a left hand or a right hand thread for the threaded tap 83 and tie bolt 84 may also aid in keeping the tie bolt 84 tightened in the threads of tap 83, depending on the rotational direction of the motor shaft 82. The nose cone 88 may be formed with a contoured surface for reduction in the aerodynamic drag as the gas refrigerant 94 enters the impeller 80. For multi-stage compressors, the nose cone 88 may be used only on the first or inlet stage (FIG. 10).

The formation of the diffuser 66 and the volute 68 by cooperation of the volute insert 56 with the discharge housing 54 can provide for a reduction in the number of components while enabling aerodynamic flexibility. The arrangement enables changes to the aerodynamic components by changing out only the volute insert 56 (e.g. to change the diffuser 66 from a vaneless to a vaned configuration, or changing the passageway characteristics of the volute 68), and may also be suitable for forming the return passages between the first and second stages in a multiple stage aerodynamic section. Thus, the discharge nozzle 72 and the discharge housing 70 can remain attached to the chiller during servicing of the aerodynamic components.

The polygon type mount 96 resolves issues associated with the removal, axial location, rotational alignment (i.e. "run-out") and balance of the impeller 80 and eye seal 77. The polygon type mount 96 need not be tapered, thus enabling the impeller to rest against a shoulder 87 on the motor shaft 82. The polygon type shape can transmit the torque from the motor shaft 82 to the impeller 80 with reduced material stress compared to keyed structures.

In operation, the aerodynamic section 42 transfers angular momentum from the impeller 80 to a gas refrigerant 94 (FIG. 7) entering from the evaporator section 34. The kinetic energy imparted by the impeller 80 to the gas refrigerant 94 can be transformed into a higher static pressure in the downstream diffusion system 74. The entire total pressure rise in the system is typically generated in the impeller 80. Approximately two-thirds of the static pressure rise is typically generated within the impeller 80 itself, with the remaining static pressure rise being generated in the downstream diffusion system 74.

The discharge nozzle 72 enables greater diffusion of the gas refrigerant 94 before entering the condenser section 30, thereby reducing the total pressure drop into the condenser section and reducing the sound pressure levels radiating from the compressor. Generally, greater diffusion (i.e. pressure recovery or static pressure increase) is realized by increasing the overall length and the exit diameter of the discharge nozzle 72. The use of weldable cast materials enables the downstream conduit 73 to be welded to the discharge nozzle 72 for installation of a check valve (not depicted) to prevent reverse flow if desired. Other welding-compatible materials may also be utilized for this purpose. Alternatively, the connection between the discharge nozzle 72 and the downstream conduit 73 may be a flanged interface (not depicted).

Multi-Stage Configuration

Referring to FIG. 10, a multi-stage aerodynamic section 42a for use in a multi-stage compressor is depicted in an embodiment of the invention. A multi-stage compressor is characterized as having more than one impeller, depicted in FIG. 10 as a first impeller 80a and a second impeller 80b. In the depicted embodiment, the first impeller 80a is housed in a first impeller housing 57a that is supported by a spacer insert 98, all defining a first stage 52a. A second stage 52b of FIG. 10 is defined by the second impeller 80b, a second impeller housing 57b and the volute insert 56 in the depicted embodiment. The first and second stages 52a and 52b may be separated by a crossover channel 99. The crossover channel 99 may be equipped with de-swirl vanes (not depicted).

The first and second stages 52a and 52b and the crossover channel 99 may be housed in a discharge housing 54. The inlet housing 58 may be positioned upstream of the first stage 52a. A spool or extension 55 may be added to the discharge housing 54, for example, in a flanged arrangement to accommodate both the first and second stages 52a and 52b. In an alternative embodiment, the discharge housing 54 and extension 55 may be a flangeless, common housing (not depicted) long enough to accommodate both the first and second stages 52a and 52b.

The first and second impellers 80a and 80b are driven by a common shaft 100. The common shaft 100 may be joined to the motor shaft 82 in a variety of ways. For example, common shaft 100 may be of a hollow, thick-walled construction and the tie bolt 84 (FIG. 9) lengthened to pass through both the first and second impellers 80a and 80b and the common shaft 100.

In another embodiment, the tie bolt 84 may be the same length as in the single stage configuration of FIG. 9, but the second impeller is adapted to threadably engage a downstream end 100b of the common shaft 100. The latter embodiment may be useful where the axial length of the multi stage aerodynamic section 42a is prohibitively long for a tie bolt 84 of extended length (e.g. where the number of stages exceeds two).

In another embodiment (not depicted), the downstream impellers (e.g. 80b) are configured with key-ways for imparting the torque to the impellers. The common shaft 100 extends to the upstream impeller (e.g. 80a) which can be attached with the tie bolt 84. Spacing between the impellers may be maintained with hollow cylindrical tubes that slide over the common shaft 100.

In still another embodiment (not depicted), a single polygon type mount configuration long enough to support and separate multiple impellers (e.g. 80a and 80b) may be utilized. The impellers could slide over the polygon type shape, again separated by a hollow cylindrical spacers.

The invention may be configured with more than two stages. Intermediate stages may be comprised of a spacer insert akin to the spacer insert 98 and an impeller akin to the second impeller 80b. In some embodiments, only the final stage of a multi-stage compressor need be fitted with a volute insert 56.

Functionally, the modular construction of the centrifugal compressor assembly 36 enables the aerodynamic section 42 of the single stage compressor 43 (FIG. 8) to be replaced with the multi-stage aerodynamic section 42a as the need arises. The modular construction enables the operator to upgrade the unit without replacing the drive train (discussed below) or other components that can be shared by the two configurations (e.g. the inlet housing 58, inlet guide vane assembly (discussed below), volute insert 56, and discharge nozzle 72). The modular construction can also simplify the parts inventory fabricated by chiller manufacturers and retained by suppliers. Multiple spools such as the extension 55 (FIG. 10) enable build up of the discharge housing 54 to whatever length is required without need for replacing the housing 54 used in the single stage configuration (FIG. 8).

In operation, the first impeller 80a typically imparts a tangential velocity component on the gas refrigerant 94 as the gas refrigerant 94 enters the crossover channel 99. The de-swirl vanes (not depicted) may be designed to remove the tangential velocity component as the gas refrigerant 94 passes through the crossover channel 99, thereby straightening the flow as it enters the second stage 52b.

Inlet Guide Vanes

Figure 12:
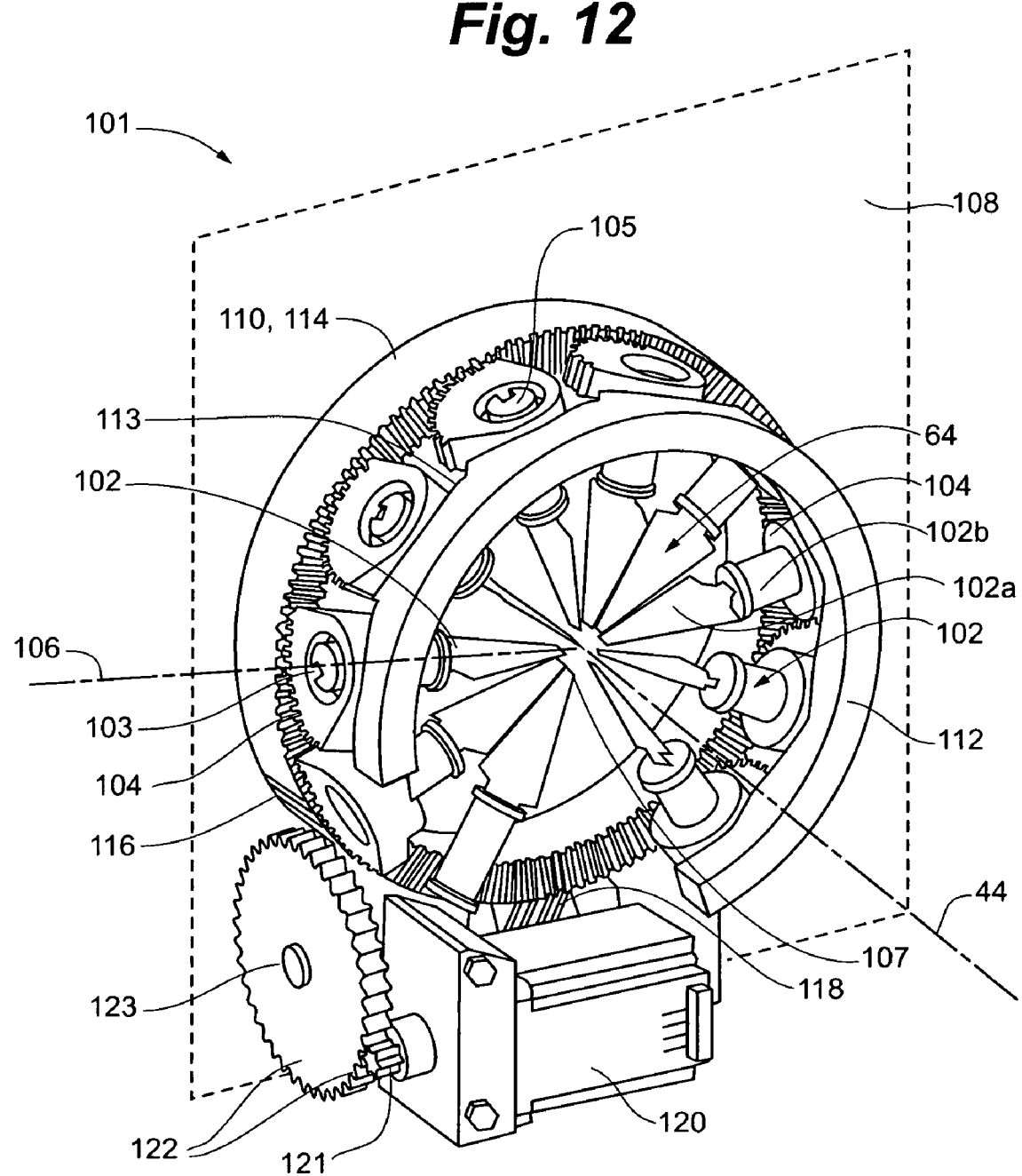
FIG. 12 is a perspective cut away view of an inlet guide vane assembly in an embodiment of the invention.

Referring to FIG. 12, the inlet guide vane assembly 64 and an actuation system 101 for actuating the inlet guide vane assembly 64 is illustrated in an embodiment of the invention. The inlet guide vane assembly 64 may include a plurality of guide vane subassemblies 102, each mounted to the inlet transition 60. (The inlet transition 60 has been removed from FIG. 12 for clarity.) Each guide vane subassembly 102 may include an airfoil portion 102a, a pedestal portion 102b configured to operatively couple with the inlet transition 60, and a gear portion 104. The gear portion 104 and pedestal 102b may mate via a key slot 103 arrangement. The guide vane subassembly 102 can be configured to rotate about an axis of rotation 106 that substantially intersects the central axis 44. In one embodiment, the pedestal 102b can be retained in a given radial location relative to the gear portion 104 with a clip ring 105.

In FIG. 12, the embodiment depicted includes a plurality of such guide vane subassemblies 102 and gear portions 104, each having their own axis of rotation 106. The multiple axes of rotation 106 are substantially located on a control plane 108. The guide vane subassemblies 102 may be sized so as not to reach the central axis 44, thus defining a hole or clearance diameter 107 in the center of the inlet guide vane assembly 64. The clearance diameter 107 may enable a minimum or threshold flow to prevent stall during light load or start-up. The clearance diameter 107 also enables access to the tie bolt 84.

The gear portions 104 may be fabricated from a polymer. The use of certain polymers, such as polyoxy-methylene (POM), also known as polyacetal, paraformaldehyde, acetal resin, polyformaldehyde, and polytrioxane (e.g. DELRIN®, manufactured by DuPont, Inc. of Wilmington, Del.), enables the gear portions 104 to be formed by injection molding. The guide vane subassemblies 102 may be cast or machined from a silicon-brass or aluminum alloy. The embodiment of FIG. 12 depicts a National Advisory Committee for Aeronautics (NACA) series 0009 symmetric airfoil shape for the guide vane subassemblies 102. Other materials and guide vane configurations may be suitable, depending on the specifics of the application.

In one embodiment, a single, ring-shaped face gear 110 that is substantially parallel with and located on the downstream side of the control plane 108 is engaged in mesh with the gear portions 104. The ring-shaped face gear 110 can also be fabricated from a high strength polymeric material, such as DELRIN or other class 5 material, in which case the ring-shaped face gear may be injection molded.

The gear portions 104 may be manufactured from self-lubricating materials that are durable enough to provide acceptable useful life and are resistant to the refrigerant or refrigerants specified for use with the chiller assembly 28. Such materials include, but are not limited to acetals (such as POM), polybutylene teraphthalate (PBT), nylon, polyphenylene sulphide (PPS), liquid crystal polymer (LCP) and polyetheretherketone (PEEK). Alternatively, metal cores may be used that are partially or entirely coated with a self-lubricating material on the exterior surfaces or on the gear contact surfaces.

Acetal possesses dimensional stability, fatigue resistance, and ability to withstand many chemicals over a wide range of temperatures. Acetal is highly lubricious and moves smoothly over both metals and plastics. PBT is a polyester suited for application in mixed gear sets having gears made from other plastics and metals and is noted for molding with smooth surfaces. Nylons are generally noted for toughness, wear resistance and low frictional resistance with other plastics and metals. PPS is generally stiff and dimensionally stable with high fatigue and chemical resistance. LCPs are noted for dimensional stability to 220° C. and resistance to most chemicals.

Fibers and fillers may be utilized to enhance gear-resin properties. For example, acetal copolymer reinforced with 25% short 2-mm glass fibers can double base resin tensile strength and triple its flexural modulus. Adding glass fibers longer than 10-mm can further enhance polymer strength, stiffness, creep and impact resistance, dimensional stability, and toughness.

A guide vane stop ring 112 having a scalloped face 113 is located on the upstream side of the gear portions 104 in an embodiment of the invention, with the scalloped face 113 oriented toward the gear portions 104. See FIGS. 12 and 14. The guide vane stop ring 112 may also be fabricated from polyoxy-methylene enabling fabrication by injection molding, or other high strength polymeric materials. Location of the ring-shaped face gear 110 and the guide vane stop ring 112 relative to the control plane 108 (i.e. upstream or downstream) is arbitrary and non-limiting.

The depicted embodiment illustrates the ring-shaped face gear 110 as having an outer periphery 114, a portion of which is machined as a worm gear 116 to mate with a worm 118. The worm 118 can be driven by a drive motor 120 through a standard drive/speed reduction gear combination 122 comprising a drive gear 121 and a speed reduction gear 123.

Functionally, the inlet guide vane assembly 64 may be used to set the inlet swirl angle either with or against the rotational direction of impeller 80. By varying the inlet guide vane angle, the work, pressure rise, and mass flow of refrigerant through the compressor stage can be controlled. The inlet guide vane assembly 64 can thus provide controlling or throttling flow of gas the refrigerant 94 through centrifugal compressor assembly 36 when operating at a partial cooling load. (Another technique involves varying the compressor speed, discussed below, which may be used in combination with the inlet guide vane assembly 64 to control the centrifugal compressor assembly 36.)

The use of self lubricating materials for the gear portions 104 inlet guide vane assembly 64 may also be designed to work in a refrigerant environment without need of lubrication oil.

Figure 13:
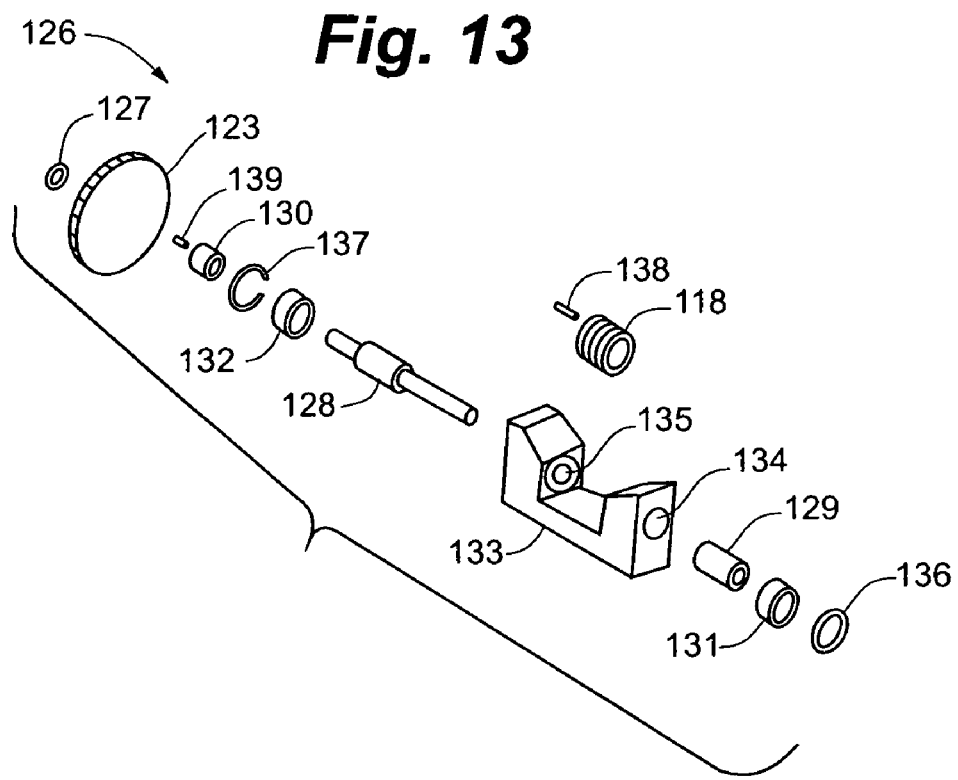
FIG. 13 is an exploded view of a worm assembly for the inlet guide vane assembly of FIG. 12.

Referring to FIG. 13, an exploded view of an embodiment of a worm assembly 126 for driving the worm gear 116 is portrayed. In this embodiment, the worm assembly 126 comprises a shaft 128, the worm 118, a long spacer 129, as short spacer 130, and two bearings 131 and 132 disposed near the ends of the shaft 128, all mounted in a worm support bracket 133. The worm support bracket 133 can be substantially U-shaped with a first port 134 in substantial axial alignment with a second port 135. The first port 134 can be configured to accept a spring washer 136, and the second port 135 configured to accept a retaining clip 137. The shaft 128 may be configured to accept a retention clip 127 at one end and gear keys 138 and 139 that mate with the worm 118 and the speed reduction gear 123, respectively.

The spacers 129, 130 are used to place the worm 118 in the proper orientation within the worm support bracket 133 in the depicted embodiment of FIG. 13. The bearings 131, 132 may provide free rotation of the shaft 128 that reduce friction and torque requirements when compared with standard contact or roller bearing designs. The worm assembly 126 can be held within the worm support bracket 133 by the opposing retention provided by the spring washer 136 and the retaining clip 137. The retention clip 127 may secure the speed reduction gear 123 between the end of the shaft 128 and the worm support bracket 133. The gear keys 138 and 139 may function to rotationally secure the worm 118 and the speed reduction gear 123, respectively.

Figure 14:
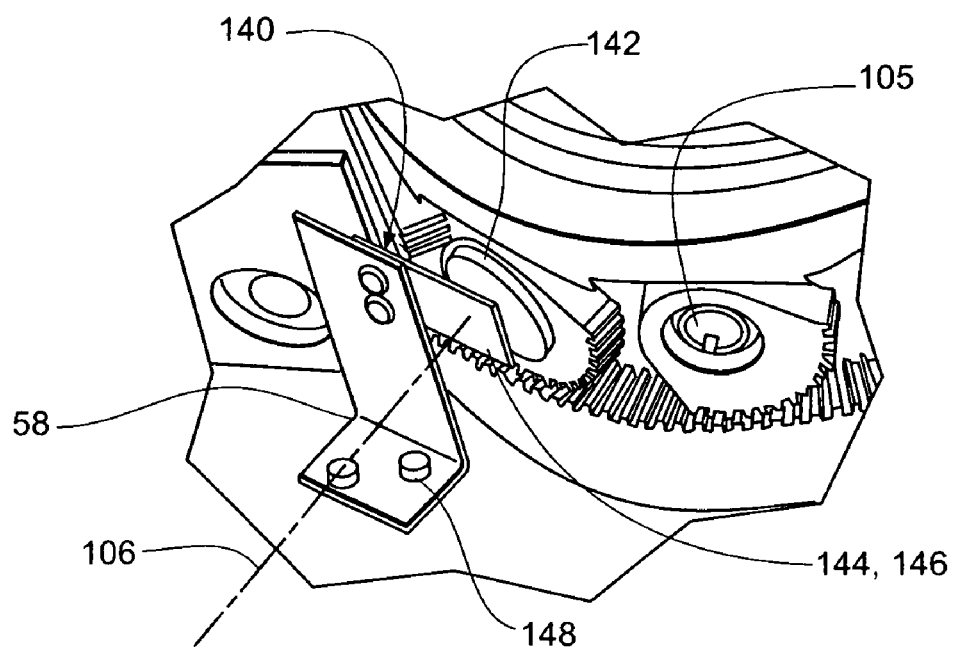
FIG. 14 is a perspective view of a magnetic position sensor mounted to the inlet guide vane assembly of FIG. 12.

Referring to FIG. 14, a position sensor 140 for determining the angular position of the inlet guide vane subassemblies 102 is illustrated in an embodiment of the invention. Suitable position sensors are commercially available, such as the MLX 90316, manufactured by Melexis Microelectronic Integrated Systems of Concord, N.H. In one embodiment, the position sensor 140 operates on a magnetic Hall effect principle, wherein a magnet 142 is embedded at or otherwise coupled to the base of the guide vane subassembly 102, and a Hall effect sensor 144 mounted on a circuit board 146 in close proximity to magnet 142 to sense the position of the magnet 142 about the axis of rotation 106. The angular position of the guide vane subassembly 102 may be derived from the sensed position of the magnet 142. The circuit board 146 may be supported by a bracket 148 mounted to the inlet housing 58. A description of the operation of the MLX 90316 is provided in "MLX90316 Rotary Position Sensor IC," 3901090316 Rev. 001 Data Sheet, 4 Oct. 2005, which is hereby incorporated by reference herein other than any express definitions of terms specifically defined therein.

In operation, the centrifugal compressor assembly 36 can be controlled by rotationally positioning the inlet guide vane subassemblies 102 to obstruct and/or direct flow to various degrees. The drive motor 120 rotates the worm 118 through the drive/speed reduction gear combination 122, which drives the worm gear 116 and causes the face gear 110 to rotate about central axis 44. The rotation of the face gear 110 in this embodiment causes each of the gear portions 104 to rotate about the respective axis of rotation 106, thereby rotating the guide vane subassembly 102. With respect to the worm assembly 126, the bearings 134 and 136 may provide free rotation of the shaft 128 for low friction and torque requirements. The scalloped face 113 of the guide vane stop ring 112 (FIG. 12) can provide a mechanical stop for the rotation of each of the gear portions 104 in both the open and closed directions, thereby preventing damaging collisions between the guide vane subassemblies 102. Other means for a mechanical stop may be used such as pins or protrusions that extend from the inlet housing 58.

The drive motor 120 may be a hermetic bi-directional stepper motor with an internal feedback loop, from which the angular position of guide vane subassemblies 102 may be determined through proper alignment and calibration. The drive motor 120 may be sized to deliver the necessary torque to drive the guide vane subassemblies 102 from a fully closed position to a fully open position. The drive motor 120 can also be sized to handle loads imposed by the aerodynamic force of a refrigerant gas 94 over the guide vane subassemblies 102 during operation. Furthermore, the drive motor 120 can be configured so that the guide vane subassemblies 102 can be held in a constant rotational position and prevented from drifting during operation.

The position sensor assembly 140 offers an alternative embodiment for determination of the angular orientation of the guide vane subassembly 102. The output signal of the Hall effect sensor 144 varies according to the angular position of a magnet 142 that that may be mounted to the end of the inlet guide vane subassembly 102. The circuit board 146 can provide connection points for signal cables (not shown) and a mounting structure for the Hall effect sensor 144.

Drive Train

Figure 15:
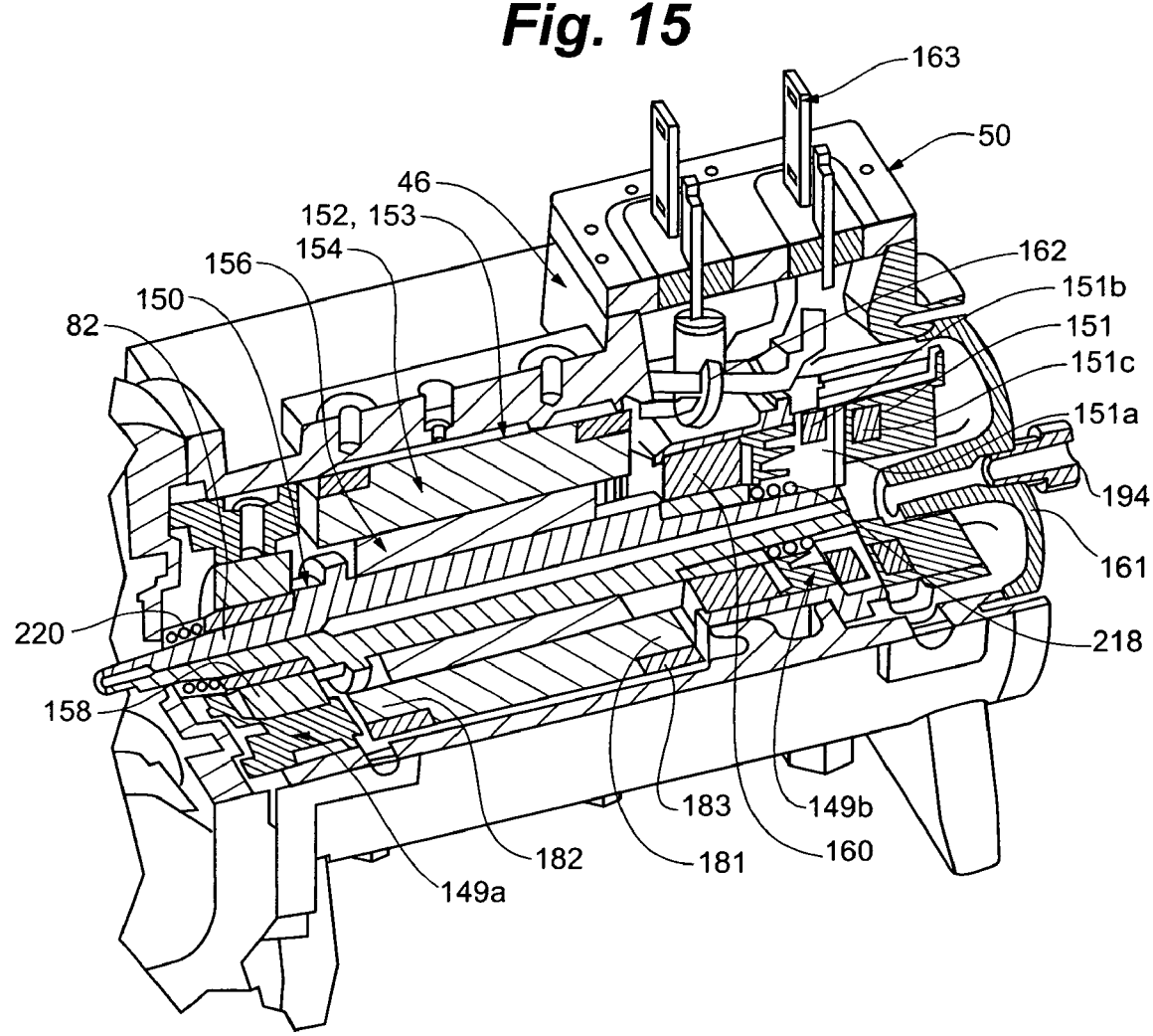
FIG. 15 is a perspective cut away view of a compressor drive train assembly in an embodiment of the invention.

Referring to FIG. 15, an embodiment of the motor housing 46 is portrayed containing a drive train 150 that includes a permanent magnet motor 152 having a stator assembly 154, a rotor assembly 156 mounted to a motor shaft 82, and oil-free, magnetic bearings 158 and 160 that suspend the motor shaft 82 during operation. The permanent magnet motor 152 may be powered through six leads 162 connected to the stator assembly 154 via a terminal bus plate assembly 163. A rotational position feedback device such as an encoder or potentiometer that detects the shaft position may also be coupled to the motor shaft 82.

The motor housing 46 and the drive train 150 may further include an end housing 161, a pair of bearing carrier subassemblies 149a and 149b, and a thrust bearing assembly 151. The thrust bearing assembly can include a runner 151a extending radially outward from the motor shaft 82 and two coils 151b and 151c that straddle the runner 151a.

In operation of the embodiment depicted in FIG. 15, the coils 151b and 151c of the thrust bearing assembly 150 magnetically interact with the runner 151a to secure the drive train 150 at an axial position within the motor housing 46, thereby providing a frictionless counterforce to forward and reverse thrust forces that are exerted on the drive train 150. The bearing carrier subassemblies 149a and 149b can provide structure for positioning the bearings on the motor center line after the motor is installed. The position feed back device may be used to determine the rotational speed of the motor shaft 82, as well as the rotational position at a given instant, both of which may be required for proper operation and control of a variable frequency drive. (Operation of variable frequency drives are discussed below.)

Figure 16:
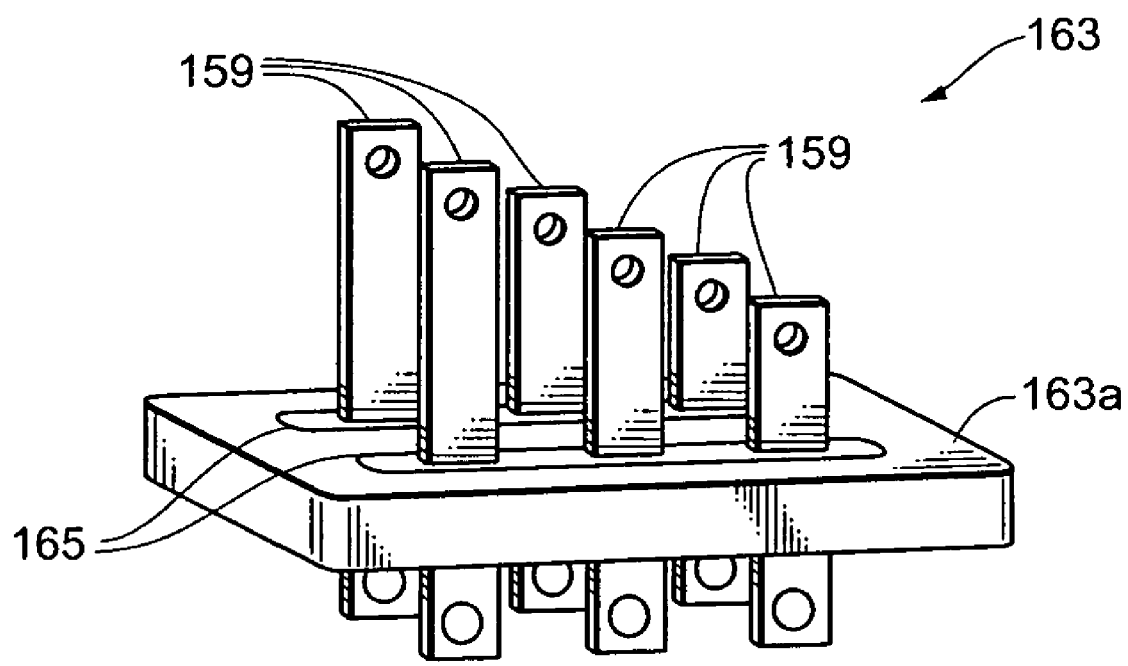
FIG. 16 is a perspective view of a terminal bus plate assembly in an embodiment of the invention.

Referring to FIG. 16, the terminal bus plate assembly 163 is presented in perspective in an embodiment of the invention. In this embodiment, six rectangular terminals 159 pass through a dielectric potting material 165 such as a glass epoxy material. The terminals 159 can be grouped in two sets of three, with each set passing through a common dielectric potting. The potting material 165 provides electrical insulation between the terminals 159 and the mounting plate 163a.

Figure 17:
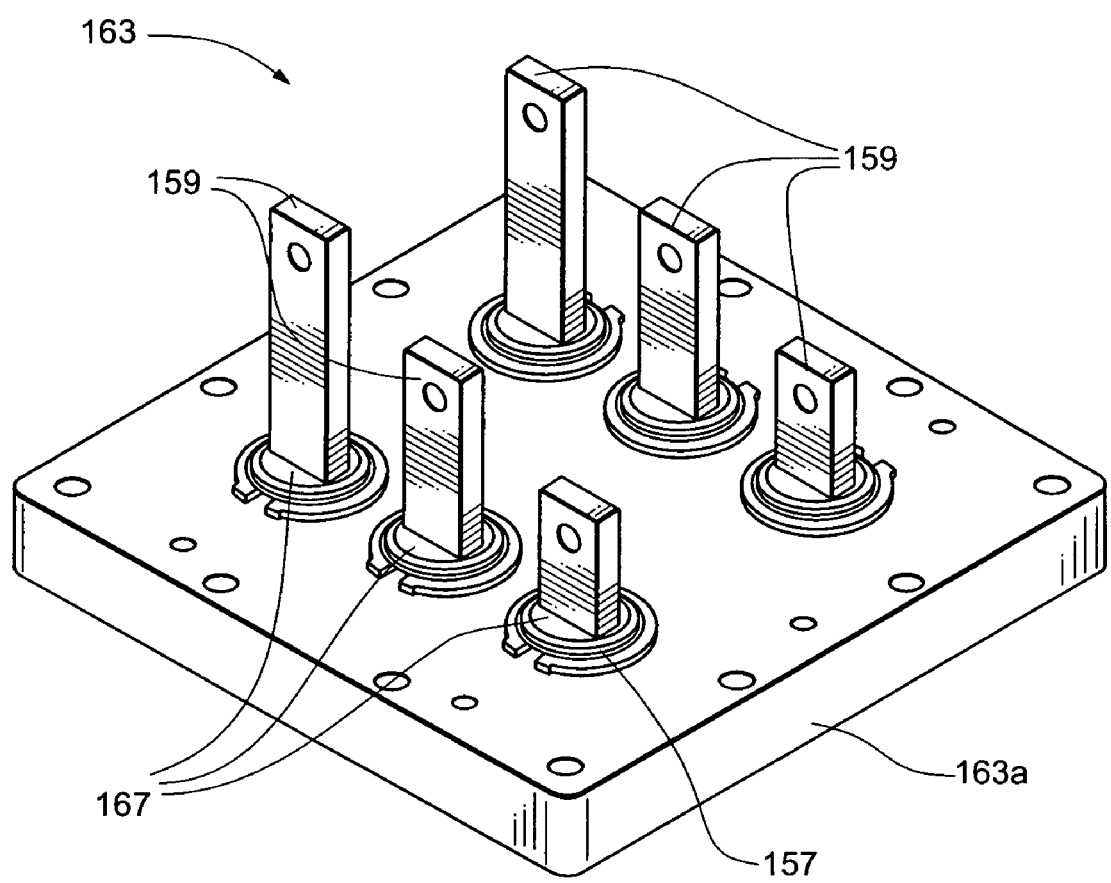
FIG. 17 is a perspective view of a terminal bus plate assembly in an embodiment of the invention.

Referring to FIG. 17, a terminal bus plate assembly 163 is presented in another embodiment of the invention, wherein each terminal 159 is individually potted within a dielectric feedthrough 167 fitted with a means such as an o-ring or a compression seals to seal to the dielectric feedthrough 167 to prevent leakage between the dielectric feedthrough 167 and the mounting plate 163a of the gas refrigerant 94 contained in the motor housing 46. Each terminal 159 and corresponding dielectric feedthrough 167 forms an assembly that can be removed individually and may be retained by snap rings 157 as depicted in FIG. 17, or by other configurations available to the skilled artisan, such as threaded connections or lock nuts.

The terminals 159 in the configurations of FIGS. 16 and 17 are typically fabricated from copper and may vary in height to facilitate the installation of power wires onto the terminals. The mounting plate 163a may be constructed from aluminum, an aluminum alloy or other suitable structural material.

Figure 18:
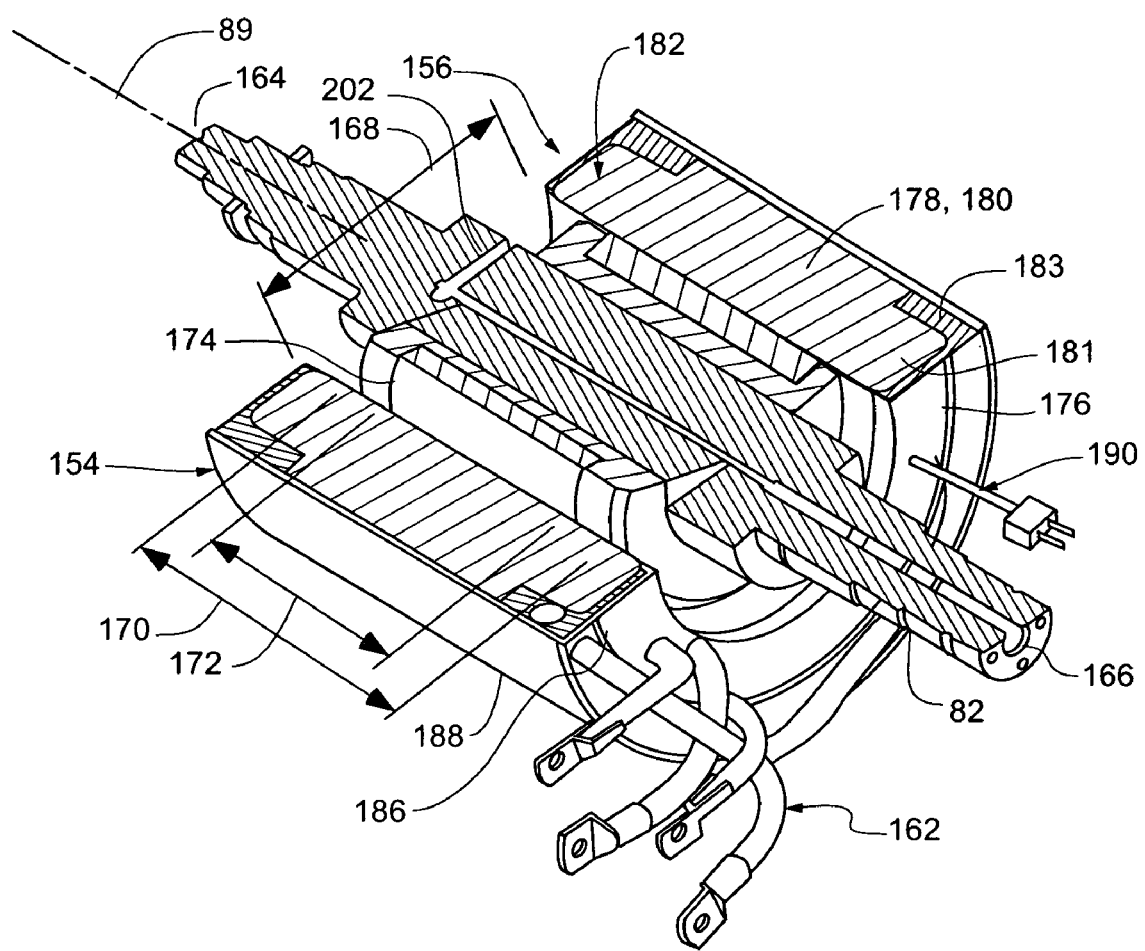
FIG. 18 is a cross-sectional view of the rotor and stator assemblies of the drive train assembly of FIG. 15.

Referring to FIG. 18, a rotor assembly 156 is portrayed in an embodiment of the invention. The motor shaft 82 includes a drive end 164 upon which the impeller 80 can be mounted, and a non-drive end 166 which extends into the motor housing 46. The rotor assembly 156 may be characterized by an internal clearance diameter 168 and an overall length 170 which may include an active length 172 over which a permanent magnetic material 174 can be deposited.

A 6-phase stator assembly 154 is also depicted in FIG. 18 in an embodiment of the invention. In this embodiment, the stator assembly 154 is generally described as a hollow cylinder 176, with the walls of the cylinder comprising a lamination stack 178 and six windings 180 having end turn portions 181 and 182 encapsulated in a dielectric casting 183 such as a high temperature epoxy resin (best illustrated in FIG. 18). A total of six leads 162 (four of which are shown in FIG. 18), one for each of the six windings 180, extend from an end 186 of the hollow cylinder 176 in this configuration. A sleeve 188 may be included that extends over the outer surface of the hollow cylinder 176 and in intimate contact with the outer radial peripheries of both the lamination stack 178 and the dielectric castings 183. The sleeve 188 may be fabricated from a high conductivity, non-magnetic material such as aluminum, or stainless steel. A plurality of temperature sensors 190, such as thermocouples or thermisters, may be positioned to sense the temperature of the stator assembly 154 with terminations extending from the end 186 of the hollow cylinder 176.

Figure 19A:
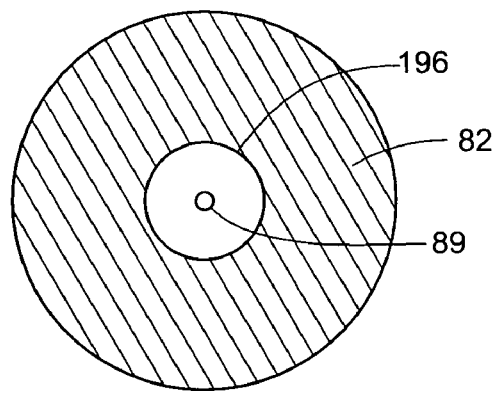
FIG. 19A is a sectional view of the motor shaft of FIG. 19.
Figure 19B:
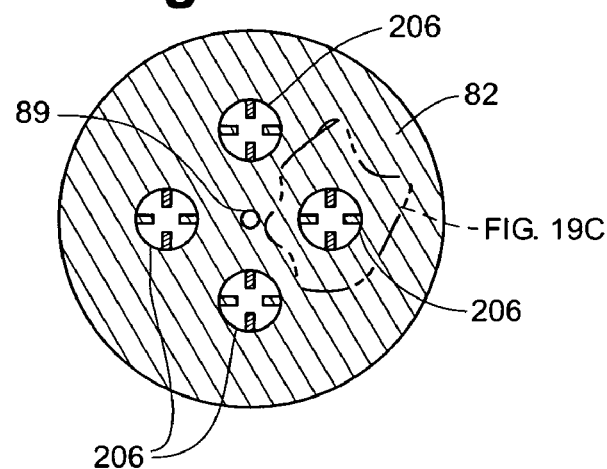
FIG. 19B is a sectional view of a motor shaft in an embodiment of the invention.
Figure 19C:
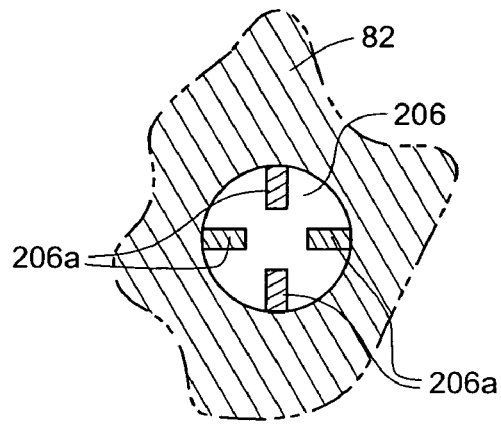
FIG. 19C is an enlarged partial sectional view of the motor shaft of FIG. 19B.

Referring to FIGS. 19 and 19A, a rotor cooling circuit 192 is illustrated in an embodiment of the invention. The rotor cooling circuit 192 may be a subpart or branch of the gas bypass circuit 40 (FIG. 1). Refrigerant gas 94 from the evaporator section 34 may enter the rotor cooling circuit 192 through an inlet passage 194 formed on the end housing 161 and may exit via an outlet passage 195 formed on the motor housing 46. Accordingly, the rotor cooling circuit 192 may be defined as the segment of the gas bypass circuit 40 between the inlet passage 194 and the outlet passage 195. The inlet passage 194 may be in fluid communication with a longitudinal passage 196 that may be a center passage substantially concentric with the rotational axis 89 of the motor shaft 82. The longitudinal passage 196 may be configured with an open end 198 at the non drive end 166 of the motor shaft 82. The longitudinal passage 196 may pass through and beyond the portion of the motor shaft 82 upon which the rotor assembly 156 is mounted, and terminate at a closed end 200.

The depiction of FIG. 19 portrays a gap 201 between the non drive end 166 of the motor shaft 82 and the end housing 161. In this configuration, refrigerant gas 94 is drawn into the open end 198 of the longitudinal passage 196 from the interior chamber 94. Alternatively, the shaft may contact cooperating structures on the end housing 161, such as dynamic seals, so that the refrigerant gas 94 is ducted directly into the longitudinal passage 196.

In one embodiment, a plurality of radial aspiration passages 202 are in fluid communication with the longitudinal passage 196 near the closed end 200, the aspiration passages 202 extending radially outward through the motor shaft 82. The aspiration passages 202 may be configured so that the gas refrigerant 94 exits into a cavity region 203 between the stator assembly 154 and the motor shaft 82. An annular gap 204 may be defined between the stator assembly 154 and the rotor assembly 156 to transfer the refrigerant gas 94. Generally, the rotor cooling circuit 192 of the gas bypass circuit 40 may be arranged to enable refrigerant gas to course over the various components housed between the rotor assembly 156 and the end housing 161 (e.g. magnetic bearing 158). The gas refrigerant 94 exiting the outlet passage 195 may be returned to the evaporator section 34. By this arrangement, components of the drive train 150 are in contact with cooling refrigerant in a vapor phase (gas refrigerant 94), and, under certain conditions, with refrigerant in a liquid phase.

Referring to FIG. 19B, a plurality of flow passages 206 are depicted that are substantially parallel with but not concentric with the rotational axis 89 of the motor shaft 82 in another embodiment of the invention. The flow passages 206 may replace the single longitudinal passage 196 of FIG. 19A as depicted, or may supplement the longitudinal passage 196. The plurality of passages may be in fluid communication with the aspiration passages 202.

The flow passages 206 may also include heat transfer enhancement structures, such as longitudinal fins 206a that extend along the length of and protrude into the flow passages 206. Other such heat transfer enhancement structures are available to the artisan, including but not limited to spiral fins, longitudinal or spiraled (rifling) grooves formed on the walls of the flow passages 206, or staggered structures. Such heat transfer enhancement structures may also be incorporated into the configuration of FIGS. 19 and 19A.

Functionally, the use of the plurality of passages may enhance the overall heat transfer coefficient between the gas refrigerant 94 and the rotor assembly 156 by increasing the heat transfer area. The heat transfer enhancement structures may also increase the heat transfer area, and in certain configurations can act to trip the flow to further enhance the heat transfer. The conductive coupling between the flow passages 206 and the outer surface of the motor shaft 82 may also be reduced because the effective radial thickness of the conduction path may be shortened. The multiple passages may further provide the designer another set of parameters that can be manipulated or optimized to produce favorable Reynolds number regimes that enhance the convective heat transfer coefficient between the gas refrigerant 94 and the walls of the flow passages 206.

A throttling device 207 may be included on the inlet side (as depicted in FIG. 19) or the outlet side of the rotor cooling circuit 192 of the gas bypass circuit 40. The throttling device 207 may be passive or automatic in nature. A passive device is generally one that has no active feedback control, such as with a fixed orifice device or with a variable orifice device that utilizes open loop control. An automatic device is one that utilizes a feedback element in closed loop control, such as an on/off controller or a controller that utilizes proportional/integral/derivative control schemes.

The temperature of the gas refrigerant 94 exiting the rotor cooling circuit 192 may be monitored with a feedback element such as a temperature sensing probe 205. The feedback element may be used for closed loop control of the throttling device 207. Alternatively, other feedback elements may be utilized, such as a flow meter, heat flux gauge or pressure sensor.

Figure 20:
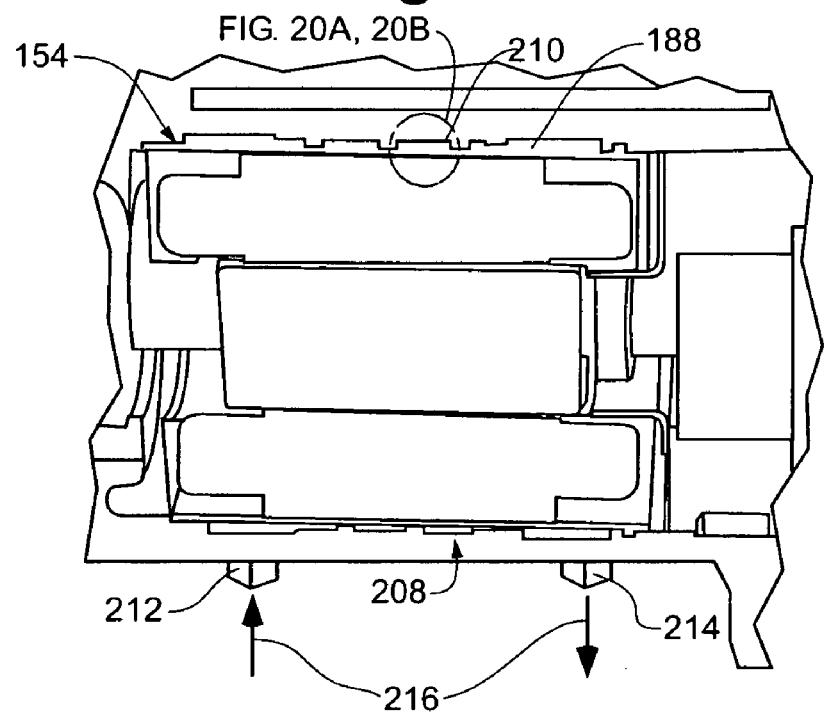
FIG. 20 is a sectional view of a compressor assembly highlighting a liquid bypass circuit for the stator assembly of the drive train assembly of FIG. 15.
Figure 20A:
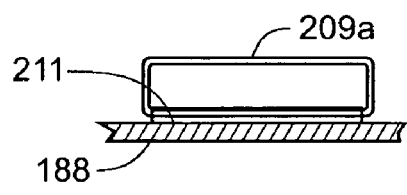
FIGS. 20A and 20B are enlarged sectional views of a spiral passageway that may be utilized in the liquid bypass circuit of FIG. 20.

Referring to FIGS. 20 and 20A, a stator cooling section 208 of the liquid bypass circuit 40 for cooling of the stator assembly 154 is highlighted in an embodiment of the invention. The stator cooling section 208 may comprise a tubing 209a that defines a spiral passageway 210 formed on the exterior of the sleeve 188. Heat transfer to the refrigerant 216 flowing in the tubing 209a may be augmented with a thermally conductive interstitial material 211 between the tubing 209a and the sleeve 188. The tubing 209a may be secured to the sleeve 188 by welding, brazing, clamping or other means known to the artisan.

Figure 20B:
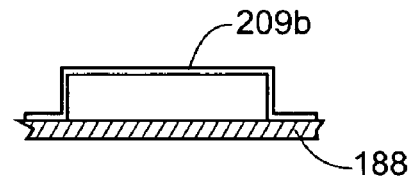

Referring to FIG. 20B, the spiral passageway 210 may comprise a channel 209b that enables a liquid refrigerant 216 flowing therein to make direct contact with the sleeve 188. The channel 209b may be secured to the sleeve 188 by welding, brazing or other techniques known to the artisan that provide a leak tight passageway.

It is further noted that the invention is not limited to a spiral configuration for the stator cooling section 208. Conventional cylindrical cooling jackets, such as the PANELCOIL line of products provided by Dean Products, Inc. of Lafayette Hill, Pa., may be mounted onto the sleeve 188, or even supplant the need for a separate sleeve.

The spiral passageway 210 can be configured for fluid communication with a liquid cooling inlet port 212 through which the refrigerant liquid 216 is supplied and a liquid cooling outlet port 214 through which the refrigerant liquid 216 is returned. The liquid cooling inlet port 212 may be connected to the condenser section 30 of the refrigeration circuit, and the liquid cooling outlet port 214 may be connected to the evaporator section 34. The refrigerant liquid 216 in this embodiment is motivated to pass from the condenser section 30 to the evaporator section 34 (FIG. 1) because of the higher operating pressure of the condenser 30 section relative to the evaporator section 34.

A throttling device (not depicted) may be included on the inlet side or the outlet side of the stator cooling section 208. The throttling device may be passive or automatic in nature.

The drive train 150 may be assembled from the non drive end 166 of the motor shaft 82. Sliding the rotor assembly 156 over the non drive end 166 during assembly (and not the drive end 164) may prevent damage to the radial aspiration passages 202.

Functionally, the permanent magnet motor 152 may have a high efficiency over wide operating range at high speeds, and combine the benefits of high output power and an improved power factor when compared with induction type motors of comparable size. The permanent magnet motor 152 also occupies a small volume or footprint, thereby providing a high power density and a high power-to-weight ratio.

Also, the motor shaft 82 may serve as a direct coupling between the permanent magnet motor 152 and the impeller 80 of the aerodynamic section 42. This type of arrangement is herein referred to as a "direct drive" configuration. The direct coupling between the motor shaft and the impeller 80 eliminates intermediate gearing that introduces transfer inefficiencies, requires maintenance and adds weight to the unit. Those skilled in the art will recognize that certain aspects of the disclosure can be applied to configurations including a drive shaft that is separate and distinct from the motor shaft 82.

In operation, the rotation of radial aspiration passages 202 within the motor shaft 82 acts as a centrifugal impeller that draws the gas refrigerant 94 through the gas bypass circuit 40 and cools the stator assembly 154. In this embodiment, gas residing in the aspiration passages 202 is thrown radially outward into the cavity 203, thereby creating a lower pressure or suction at the closed end 200 that draws the refrigerant gas 94 through the inlet passage 194 from the evaporator section 34. The displacement of the gas into the cavity 203 also creates and a higher pressure in the cavity 203 that drives the gas refrigerant 94 through the annular gap 204 and the outlet passage 195, returning to the evaporator section 34. The pressure difference caused by this centrifugal action causes the refrigerant gas 94 to flow to and from the evaporator section 34.

The cooling of the rotor assembly 156 may be enhanced in several respects over existing refrigeration compressor designs. The rotor assembly 156 is cooled along the length of the internal clearance diameter 168 by direct thermal conduction to the cooled motor shaft 82. Generally, the outer surface of the rotor assembly 156 is also cooled by the forced convection caused by the gas refrigerant 94 being pushed through the annular gap 204.

The throttling device 207 may be used to control the flow of gas refrigerant 94 and the attendant heat transfer thereto. The temperature sensing probe 205 may be utilized as a feedback element in the control of the flow rate of the refrigerant gas 94.

The use of the refrigerant gas 94 has certain advantages over the use of the refrigerant liquid 216 for cooling the rotor. A gas typically has a lower viscosity than a liquid, thus imparting less friction or aerodynamic drag over a moving surface. Aerodynamic drag reduces the efficiency of the unit. In the embodiments disclosed, aerodynamic drag can be especially prevalent in the flow through the annular gap 204 where there is not only an axial velocity component but a large tangential velocity component due to the high speed rotation of the rotor assembly 156.

As disclosed in one embodiment, the stator assembly 154 may be cooled by the liquid refrigerant 216 that enters the spiral passageway 210 as a liquid. However, as the liquid refrigerant 216 courses through the stator cooling section 208, a portion of the refrigerant may become vaporized, creating a two phase or nucleate boiling scenario and providing very effective heat transfer.

The liquid refrigerant 216 may be forced through the liquid bypass circuit 40 and the stator cooling section 208 because of the pressure differential that exists between the condenser section 30 and the evaporator section 34. The throttling device (not depicted) passively or actively reduces or regulates the flow through the liquid bypass circuit 40. The temperature sensors 190 may be utilized in a feedback control loop in conjunction with the throttling means.

The sleeve 188 may be fabricated from a high thermal conductivity material that thermally diffuses the conductive heat transfer and promotes uniform cooling of the outer peripheries of both the lamination stack 178 and the dielectric castings 183. For the spiral wound channel 209b configuration, the sleeve 188 further serves as a barrier that prevents the liquid refrigerant 216 from penetrating the lamination stack 178.

The encapsulation of the end turn portions 181, 182 of the stator assembly 154 within the dielectric castings 183 serves to conduct heat from the end turn portions 181, 182 to the stator cooling section 208, thereby reducing the thermal load requirements on the rotor cooling circuit 192 of the gas bypass circuit 40. The dielectric casting 183 can also reduce the potential for erosion of the end turn portions 181, 182 exposed to the flow of the gas refrigerant 94 through the rotor cooling circuit 192.

Magnetic Bearings

In various embodiments of the invention, the rotor assembly 156 is supported by frictionless magnetic bearings 158 and 160 under normal operation. The bearings 158, 160 are controlled and levitated by microprocessor controllers and power amplifiers which may be contained within an electronics enclosure 217 on the compressor body or located remotely.

Also, "back-up" rolling element bearings 218 and 220 may be provided to constrain the rotating assembly and protect it from damage during a catastrophic control failure of the magnetic bearings 158 and 160. In certain embodiments, the backup bearings 218 and 220 have an inner diameter that is greater than the diameter of the motor shaft 82. The magnetic bearings 158 and 160, backup bearings 218 and 220 and motor shaft 82 may be arranged so that the motor shaft 82 is substantially centered within the inner diameter during operation, creating an annular gap between the motor shaft 82 and each of the magnetic bearings 158 and 160. The gaps enable the motor shaft 82 to rotate freely without contacting the backup bearings 218, 220. By this arrangement, the backup bearings 218, 220 do not contact the rotor assembly 156 during normal operation.

Variable Frequency Drive

Referring to FIG. 21, a variable frequency drive system (VFD system) 248 that drives the permanent magnet motor 153 in a six-phase arrangement is schematically depicted in an embodiment of the invention. In this embodiment, a total of six power leads 250 transmit power to a pair of three-phase windings 252a and 252b. Each set of three-phase windings 252a and 252b may be powered by a separate and independent variable frequency drive (VFD) power section 254a and 254b that may be sourced through an autotransformer 256 connected to a mains supply 224.

In a six-phase configuration, the autotransformer 256 may provide a 30-degree phase shift between the VFD power sections 254a or 254b. The autotransformer 256 can also be used to raise or lower the incoming voltage as required according to the demands of the VFD.

The six-phase embodiment is depicted and described herein, but the invention is not limited thereby. For example, a single power section could provide power for a permanent magnet motor having one set of 3-phase windings. In this alternative embodiment, the autotransformer 256 is not used for phase shifting but may be used to raise or lower the incoming voltage to that required by the VFD power section 254a and 254b.

The VFD power sections 254a and 254b may each comprise an input rectifier 258, a filter 260, a current chopper 262 and a steering circuit 264, all connected through a DC bus 266 as depicted in FIG. 21. The rectifier 258 converts the AC power from the autotransformer 256 to a DC power. The types of rectifiers that may be utilized include a diode bridge, a thyrister controlled rectifier, or a combination thereof. The filter 260 reduces the ripple of the rectified DC power. The current chopper 262 and steering circuit 264 combine to form an inverter 268.

The inverter 268 converts the DC power to a 3-phase AC power at a frequency corresponding to a desired rotational speed of the permanent magnet motor 153. The switching of the currents on the DC bus 266 is accomplished with insulated gate bipolar transistors (IGBTs) using pulse width modulation (PWM).

In one embodiment, the inverter 268 is referred to as a "current source" type wherein the output to the permanent magnet motor 153 is a controlled AC current rather than a controlled AC voltage. Current source drives can be seen in references such as "Introduction to Power Electronics and Drives," Bimal K. Bose, ed. Ch5, 1997, Institute of Electrical and Electronics Engineers, ISBN0-7803-1061-6 which is hereby incorporated by reference other than any express definitions of terms specifically defined therein.

The power electronics, control methods, and microprocessor controls enable users to take advantage of the benefits of a current source drive with few of the drawbacks. The current source inverter uses a lower switching frequency in the inverter and lower voltage rise time (dV/dT), thereby reducing motor stress and improving overall system efficiency. The current source inverter also has inherent current-limiting abilities. Current source inverters typically include large inductors in the DC link with attendant cost and weight. Current control methods may be quite sophisticated for control of harmonics on the input and output.

Other references relating to specific design issues regarding control methods, efficiency, use with permanent magnet motors, and harmonics mitigation are enumerated below. All are hereby incorporated by reference other than any express definitions of terms specifically defined therein.

"A general purpose voltage regulated current-source inverter power supply," Espinoza, J. R.; Joos, G.; Ziogas, P. D.; Applied Power Electronics Conference and Exposition, 1993. APEC '93. Conference Proceedings 1993, Eighth Annual 7-11 Mar. 1993 Page(s):778-784

"A low-harmonic electric drive system based on current-source inverter," Yuexin Yin; Wu, A. Y., Industry Applications, IEEE Transactions on Volume 34, Issue 1, January-February 1998 Page(s):227-235

"Voltage control of current source inverters," Colli, V. D.; Cancelliere, P.; Marignetti, F.; Di Stefano, R.; energy Conversion, IEEE Transactions on Volume 21, Issue 2, June 2006 Page(s):451-458

"A current-source-inverter-fed induction motor drive system with reduced losses," Espinoza, J. R.; Joos, G.; Industry Applications, IEEE Transactions on Volume 34, Issue 4, July-August 1998 Page(s):796-805

"Implementation of current source inverter for power line conditioning," Williams, S. M.; Hoft, R. G.; Industry Applications, IEEE Transactions on Volume 27, Issue 4, July-August 1991 Page(s):773-779

"An integrated three-phase voltage regulated current source inverter topology," Espinoza, J.; Joos, G.; Ziogas, P.; Industrial Electronics, 1993. Conference Proceedings, ISIE'93-Budapest, IEEE International Symposium on 1-3 Jun. 1993 Page(s):663-668

"Brushless permanent magnet (BPM) motor drive system using load-commutated inverter," Toliyat, H. A.; Sultana, N.; Shet, D. S.; Moreira, J. C.; Power Electronics, IEEE Transactions on Volume 14, Issue 5, September 1999 Page(s):831-837

"High-efficiency drives using permanent-magnet motors," Slemon, G. R.; Industrial Electronics, Control, and Instrumentation, 1993. Proceedings of the IECON '93, International Conference on 15-19 Nov. 1993 Page(s):725-730 vol.

A function of the current chopper 262 (aka step down converter, buck converter or multi-phase buck converter) in various embodiments is to maintain the DC bus voltage at the proper level above the back-emf of the permanent magnet motor 153 and to maintain a constant current source for the permanent magnet motor 153. The current chopper 262 may comprise a network of diodes, large inductors, and switching devices. The switching devices may be a plurality of insulated gate bipolar transistors (IGBTs) that are arranged in parallel and are controlled in an interleaved or multi-phase pattern. This control pattern switches the IGBTs "on" at different points in time which reduces the ripple in the DC link and smoothes the current supply.

The steering circuit 264 may include a network of switching devices that convert the DC power to a pulsed, 3-phase AC power using a PWM control pattern. The power to the respective 3-phase winding 252a or 252b of the permanent magnet motor 153 may be switched at a rate according to the desired motor speed. This type of inverter output section can use a much lower switching frequency as compared to a voltage source drive.

Another embodiment of this invention uses a voltage source inverter. In this type of inverter, the DC voltage is maintained and the IGBTs switch at a higher rate.

Functionally, the VFD system 248 may be matched to provide sufficient torque and speed for the centrifugal impeller 80 or impellers 80a and 80b to meet the operational requirements of the chiller. The VFD system 248 may reduce power line harmonics and enhance drive train efficiency over conventional designs. The use of two VFD power sections 254a and 254b to feed independent windings in the motor negates the need to coordinate the DC bus voltage or current using an interphase transformer as with traditional 12-pulse VFDs. The arrangement also reduces motor heating and energy losses.

The VFD system 248 may be designed for high speed operation to accommodate a range of impeller size and refrigerant combinations that may be implemented in the modular design of the invention. Rotational speeds in excess of 20,000 rpm are attainable.

In one embodiment, the VFD system 248 includes heat sinks having a cooling bypass circuit (not depicted) that accommodates a liquid or a gas refrigerant. The cooling bypass circuit may include a control valve and a feedback temperature element from the heat sink to control the heat sink at a desired temperature (not depicted). The wetted components of the heat sink may be selected for compatibility with the refrigerant to be used (e.g. refrigerant R-134a and polyester oil). Electronics in close proximity to actively cooled components may be designed to avoid or accommodate moisture from condensation. Various embodiments may use water as the cooling fluid.

The rectifiers 258 may generate harmonics that may cause a variety of maladies not only to the plant equipment, but to neighboring facilities via the power grid that feed the mains supply 224, particularly for high power installations. The problems potentially caused by harmonics include conductor overheating, failure or rupture of capacitors, spurious tripping of breakers, overheating of transformer windings, as well as interference with controllers, computers and utility meters in a facility or on the power grid.

The 30-degree phase shift provided by the autotransformer 256 can mitigate these issues by reducing attendant power line harmonics and providing a 12-pulse input to the inverters (e.g. 6 pulses to each of the two inverters 268 of FIG. 21). The 12-pulse input may eliminate the $5^{th}$ and $7^{th}$ harmonics. In addition, the phase shifting in the 6-phase motor configuration may reduce motor heating and maximize efficiency. These methods reduce the power harmonics and may be utilized with additional harmonic filters as necessary to meet IEEE-519 requirements.

Intermediate Power Supply

Figure 22:
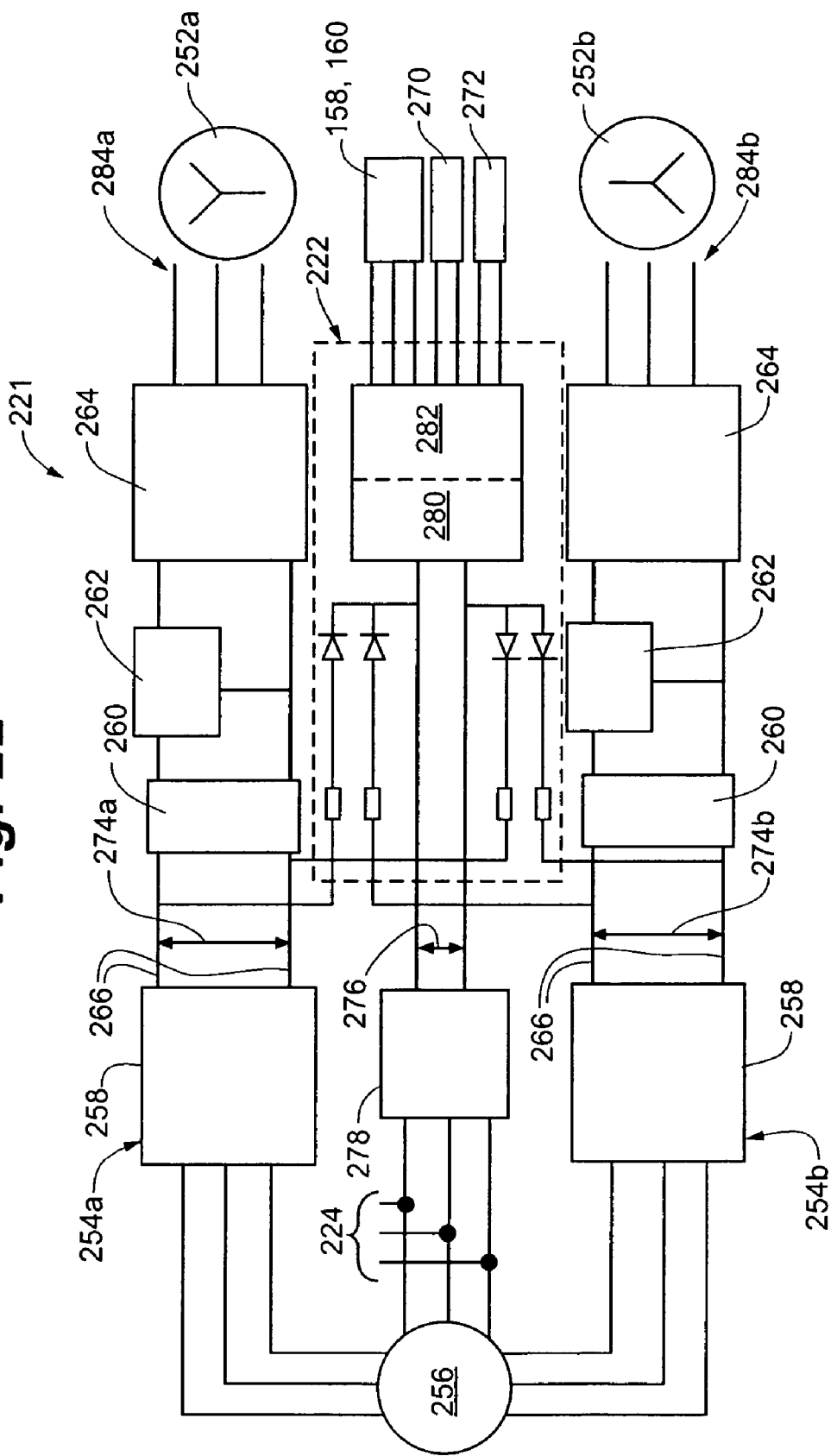
FIG. 22 is an electrical schematic of a power supply system having redundant intermediate power sources in an embodiment of the invention.

Referring to FIG. 22, a power supply and VFD system 221 including an intermediate power supply 222 that drives the magnetic bearings 158 and 160, a magnetic bearing controller 270 and a VFD controller 272 is depicted in an embodiment of the invention. Under normal operation, the intermediate power supply 222 may be sourced by DC-link voltages 274a and 274b from the DC buses 266 of each VFD 254a and 254b. An additional DC input 276 to the intermediate power supply 222 may also be derived through a rectifier 278 from the incoming mains supply 224.

In one embodiment, the intermediate power supply 222 includes a switching converter 280 and a bank of isolating power supply transformers 282 to convert the DC-input 276 or the intermediate DC-link voltage 274 to a specified auxiliary supply voltage. The magnetic bearings 158 and 160, the magnetic bearing controller 270, and the VFD controller 272 may be connected to the appropriate isolating power supply transformers 282.

Various embodiments of the invention may also source the intermediate power supply 222 with back-emf voltages 284a and 284b provided by the revolution of the respective 3-phase winding 252a or 252b of the permanent magnet motor 153. When the permanent magnet motor 153 is spinning, the back-emf voltages 284a and 284b may be the only power source present on the DC buses 266 in the event of an interruption of power from the mains supply 224. The back-emf voltages 284a and 284b are generally proportional to the rotational speed of the permanent magnet motor 153.

Functionally, redundant sources for the intermediate power supply 222 enables functional energization of the compressor assembly without the DC-link voltages 274a and 274b being present. For example, the intermediate power supply may be source through the rectifier 278 when the VFDs are not fully powered or when there is no back-emf voltage present, such as during initial system start up or servicing of the system. When the PM motor 153 is spinning, the back-emf voltages 284a and 284b may provide an alternative power source to the intermediate power supply 222. Such redundancy provides additional security of supply not only to the magnetic bearings 158, 160, but also to the magnetic bearing controller 270 in the event that failure of the VFDs 254a and 254b result in the loss of the DC-link voltages 274a and 274b.

In normal operation, the AC voltages put out by the inverters 268 may be controlled to be just above the back emf voltages 284a and 284b produced by the permanent magnet motor 153. Phase timing for the switching of the IGBTs in the inverters 268 may be accomplished with a rotational position feedback device feedback device.

When the mains input supply voltage 224 is lost, the DC-link voltages 274a and 274b may be maintained by the back-emf voltages 284a and 284b. The back-emf passes through diodes arranged in a "freewheel" configuration that are applied in parallel with the IGBT switching devices. In this configuration, the freewheel diodes act as a rectifier to supply the DC bus. The power to the magnetic bearings 158, 160 and magnetic bearing controller 270 can thereby be maintained during transients and line dips experienced by the mains supply 224 to prevent damage to the magnetic bearings 158, 160.

The VFDs 254a and 254b may be configured to operate at a variety of standard mains supply voltages (e.g. 380, 400, 415, 440, 460, 480 and 575V) with appropriate variations (e.g. ±10%) and at 50 or 60 Hz line frequency. The accommodation of the variety of input voltages can generate a wide range of DC-link voltages 274a, 274b. The ability to operate at reduced voltage and frequency imposes a further variable on the DC-link voltage 274 delivered to the intermediate power supply 222. Accordingly, some level of regulation may be utilized in delivering power to the bearings 158, 160 and controllers 270 and 272.

In one configuration, the VFD controller 272 may enable the VFD system 248 to spin the permanent magnet motor 152 and communicate the status of the VFD system 248 to other components of the chiller system.

The VFD system 248 may be configured to transmit and receive setup and operating data over an Ethernet network local to the chiller installation. Also, the VFD system 248 may have an FTP server to upload software updates over the Ethernet network and an HTTP server to monitor and set up the drive.

Referring to FIG. 23, the intermediate power supply 222 may be further configured to provide a "regenerative boost" 286 to the DC-link voltages 274a and 274b. The regenerative boost 286 may be achieved by revising the switching regime of the IGBTs in the output inverter of the VFD 264. Maintaining the DC link voltages 274a and 274b also, in turn, maintains the output voltage from the intermediate power supply 222.

The boost can be accomplished by adjusting the inverter switching pattern to simulate a "boost" converter. In this type of DC-to-DC converter, the output voltage exceeds the input voltage due to the circuit arrangement including the DC link inductors (energy storage device), diodes, and IGBTs.

An example effect of the regenerative boost 286 is presented in FIG. 23 as a normalized graph of the DC-link voltage 274 and a rotational speed 290 of the permanent magnet electric motor 153. The dashed line represents a non-boosted voltage 288 of the DC-link voltage 274 that occurs without the regenerative boost 286. The non-boosted voltage 288 drops proportionally with speed. The output of the intermediate power supply 222 may thereby be maintained down to approximately 5% rated rotational speed 290 of the permanent magnet motor 153.

The DC-link voltage 274 of the regenerative boost configuration is represented by the solid line 286. The effect of the regenerative boost can be realized at rotational speeds 290 below approximately 40% of rating, whereas the DC-link voltage 274 may be maintained constant until the rotational speed 290 drops below approximately 2% of rated. Below 2% of rated rotational speed 290, the DC-link voltage 274 drops off sharply, reaching a zero output at approximately 1% of the rated rotational speed.

Therefore, the regenerative boost may be configured to provide enough DC-link voltage 274 above a threshold that maintains the controllers 270 and 272 down to a rotational speed 290 that is near zero and, depending on the rated DC-link voltage, could also provide adequate power or voltage above a threshold value that maintains the magnetic bearings 158, 160 down to the same rotational speed 290.

Some energy loss may occur due to non-ideal electrical components. Therefore, the backup bearings 218, 220 can support the rotating assembly if there is any residual rotational speed after an abnormal a loss of bearing control. Under normal shutdown conditions, the bearing controller may bring the motor shaft 82 to a complete stop prior to lowering the motor shaft 82 onto the backup bearings 218, 220.

A description of apparatuses and methods for switching power supplies and variants such as boost converters, buck converters and multiphase converters are found in the references enumerated below, all of which are hereby incorporated by reference other than any express definitions of terms specifically defined therein:

Mohan, Ned; Undeland, Tore M., Robbins, William P. (2003). *Power Electronics*.
Hoboken: John Wiley & Sons, Inc. ISBN 0-471-42908-2
Power Electronics. Converters, Applications and Design.
N. Mohan, T. M. Undeland and W. P. Robbins.
John Wiley&Sons ISBN 0-471-58408-8

Power Electronics. Circuits, Devices and Applications.
M. H. Rashid
Prentice Hall ISBN 0-13-686619-0.
Principles of Power Electronics.
J. G. Kassakian, M. F. Schlecht and G. C. Verghese.
Addison-Wesley ISBN 0-201-09689-7

Assembly Procedures

The following procedures may be utilized for assembly of various components of the compressor assembly. Certain steps may be optional and not required to achieve the desired assembly. The sequence of the steps may also be changed and are therefore non-limiting.

A procedure for assembling the motor/bearing assembly in an embodiment of the invention may be as follows.

Elevate temperature of motor housing 46.
Insert stator assembly 154 into motor housing 46.
Allow housing to cool, securing stator to motor housing.
Install an anti-rotation pin that provides additional shear resistance between the motor housing 46 and the stator assembly 154 for torque retention.
Attach motor terminal block 50 to motor housing 46.
Secure motor leads to terminals with bolts and nuts.
Insert front radial magnetic bearing 158 and backup bearing 220 into the front bearing carriers.
Connect bearing power and sensor leads to the electronics terminals.
Insert the carrier assembly into the housing and secure with screws.
Insert the motor rotor/shaft assembly 150, 156 into the front bearing cartridge using the necessary fixtures.
Insert the tear radial magnetic bearing 160, the front thrust bearing actuator 151b, and the backup bearings 218, 220 into the rear bearing carriers 149b.
Connect the bearing power and sensor leads to the electronics terminals.
Insert the carrier assembly into the motor housing 46 and secure.
Insert the thrust runner 151a onto the motor shaft.
Insert the thrust bearing actuator 151c into the rear-bearing carrier and secure.
Insert o-ring into the motor housing end cover 161.
Attach motor housing end cover to the housing.

It is noted that the aerodynamic section 42 may be designed for servicing with the discharge housing 54 attached to the motor housing 46, allowing the discharge nozzle 72 to remain in place during servicing of the aerodynamic section 42 and thereby reducing servicing downtime. In addition, the discharge housing 54 can be rotated about the central axis 44 to provide flexibility in assembling the centrifugal compressor assembly 36. See FIG. 6.

A procedure for installing the impeller 80 onto the motor shaft 82 in accordance with the configuration depicted in FIG. 9 may be as follows:

Before installation of the impeller 80, verify that the shaft seal 76 has been installed.
Align the motor shaft 82 with the impeller 80 and push the impeller onto the motor shaft 82. Impeller should rest against the shoulder 87.
Install the flat washer 90 and two spring washers 92 into the front counterbore 85 of the impeller 80.
Insert the tie bolt 84 through the impeller bore 81 and threadably engage the tie bolt 84 with the threads located in the protruding portion 86 of the motor shaft 82; tighten the tie bolt according to established torque specifications.
Insert the nose cone 88 into the front counterbore 85 and tighten to established torque specifications. The nose cone can be screwed on by placing a pin through the radial holes and by turning. Note: nose cone uses a left hand tread.

Assembly of the centrifugal compressor assembly 36 may be achieved through the following procedures:

Install the shaft seal 76 in the discharge housing 54 using the wave spring 78 and the retaining ring 79.
Fasten the discharge housing 54 to the motor housing 46.
Mount the impeller 80 to the motor shaft 82 (see impeller mounting procedure above).
Insert the volute insert 56 into the discharge housing 54 and secure in place with fasteners.
Insert the impeller eye seal 77 and the wave spring 78 over inlet edge of the impeller housing 57.
Install the inlet guide vane assembly 64 in the inlet housing 58.
Align, insert and fasten the inlet housing 58 to the discharge housing 54.
Check the fit of the impeller eye seal 77 by rotating the impeller 80.

Assembly of a multi-stage aerodynamic section would follow a similar method and can be applied to a nearly identical drive train with variations in shaft length and bearing loads.

A procedure for assembling the worm assembly 126 may be as follows (please refer to FIG. 13):

Place the worm 118 into the cutout of the worm support bracket 133.
Insert the shaft 128 through the ports 134, 135 on the worm support bracket 133 housing 133, engaging the worm gear as shown in FIG. 13. Align the worm gear key way with the shaft key way and insert the worm gear key 139 to lock worm gear to shaft.
Insert the long spacer 129, bearing 131 and spring washer 136 into the first port 134 in the worm support bracket 133. Secure the spring washer 136 within the first port 134.
Slide the bearing 132 over the shaft 128 and into the second port 135 and install retaining clip 137 within the second port 135.
Place the short spacer 130 onto the shaft 128.
Place the speed reduction gear 123 onto the shaft 128. Align the gear key way with the shaft key way and install the gear key 139 to rotationally fix the speed reduction gear 123 with respect the shaft 128.
Install retention clip 127 onto the shaft 128.

A procedure for assembling the inlet guide vane assembly 64 can be as follows (please refer to FIG. 12):

Place the face gear 110 onto the inlet housing 58 with the teeth facing away from the housing
Insert guide vane subassemblies 102 into the inlet housing 58 in the proper orientation of the guide vane subassemblies 102. Once guide vane subassemblies 102 are inserted, rotate the vanes to the closed position.
Place a gear portion 104 onto each guide vane subassembly 102, aligning the key slots 103 in the gear portion 104 and the guide vane subassembly 102.
Place a key (not depicted) into the slot of each vane/spur gear assembly.
Install the clip ring 105 on each guide vane assembly 102.
Mount the guide vane stop ring 112 on the inlet housing 58 with the scallop face 113 facing the spur gears 104.
Fasten the worm assembly 126 to the inlet housing 58, making sure there is a proper fit between the worm 118 and the worm gear 116 on the face gear 110.
Mount the drive gear 121 to the drive motor 120.

Fasten the drive motor 120 to the worm assembly 126, engaging the drive motor gear 121 with the speed reduction gear 123.

The invention may be practiced in other embodiments not disclosed herein. References to relative terms such as upper and lower, front and back, left and right, or the like, are intended for convenience of description and are not contemplated to limit the invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

For purposes of interpreting the claims for the invention, it is expressly intended that the provisions of Section 112, sixth paragraph of 35 U.S.C. are not to be invoked unless the specific terms "means for" or "step for" are recited in the subject claim.

What is claimed is:

1. A chiller system comprising:
   a compressor assembly including a permanent magnet motor and an aerodynamic section, said permanent magnet motor including a rotor assembly operatively coupled with a motor shaft and a stator assembly to produce rotation of said motor shaft, said motor shaft being operatively coupled with at least two magnetic bearings and being rotatable about a rotational axis, said motor shaft and said aerodynamic section being arranged for direct drive of said aerodynamic section, wherein said motor shaft further comprises at least one longitudinal passage and at least one aspiration passage disposed proximate to the end of said longitudinal passage, said at least one longitudinal passage extending substantially parallel with said rotational axis of said motor shaft through at least said portion of said motor shaft, each of said at least one aspiration passage defining an axis having a component that is normal to said rotational axis and being in fluid communication with said at least one longitudinal passage;
   a condenser section and an evaporator section, each operatively coupled with said aerodynamic section, said condenser section having a higher operating pressure than said evaporator section;
   a liquid bypass circuit that cools said stator assembly with a liquid refrigerant, said liquid refrigerant being supplied by said condenser section and returned to said evaporator section, said liquid refrigerant being motivated through said liquid bypass circuit by said higher operating pressure of said condenser section relative to said evaporator section; and
   a gas bypass circuit that cools said rotor assembly with a gas refrigerant having a source line and a return line and including said at least one longitudinal passage and said at least one aspiration passage, said source line and said return line being connected directly to said evaporator section, said gas refrigerant being drawn from said evaporator section and returned to said evaporator section by pressure differences caused by said rotation of said at least one aspiration passage about said rotational axis.

2. The chiller system of claim 1 further comprising a throttling device operatively coupled with said gas bypass circuit for regulating a flow rate of said gas refrigerant.

* * * * *